(12) United States Patent
Papadopoulos et al.

(10) Patent No.: US 10,116,519 B2
(45) Date of Patent: Oct. 30, 2018

(54) PROGRAMMABLE DISTRIBUTED MANAGEMENT SYSTEM OF INTERCONNECTED THINGS AND APPLICATIONS

(71) Applicant: YODIWO AB, Stockholm (SE)

(72) Inventors: George Papadopoulos, Patras (GR); Alexandros Maniatopoulos, Patras (GR); Nikolaos Kostis, Patras (GR); Petros Vasileiou, Patras (GR); Sofia-Maria Dima, Patras (GR); Per Mårtensson, Ullared (SE); Emmanouil Galetakis, Patras (GR)

(73) Assignee: YODIWO AB, Stockholm (SE)

( * ) Notice: Subject to any disclaimer, the term of this patent is extended or adjusted under 35 U.S.C. 154(b) by 152 days.

(21) Appl. No.: 15/082,141

(22) Filed: Mar. 28, 2016

(65) Prior Publication Data

US 2016/0285708 A1   Sep. 29, 2016

Related U.S. Application Data

(60) Provisional application No. 62/248,743, filed on Oct. 30, 2015, provisional application No. 62/139,375, filed on Mar. 27, 2015.

(51) Int. Cl.
| | |
|---|---|
| *H04L 12/26* | (2006.01) |
| *H04L 29/08* | (2006.01) |
| *H04L 12/24* | (2006.01) |

(52) U.S. Cl.
CPC .............. *H04L 41/14* (2013.01); *H04L 67/10* (2013.01); *H04L 67/12* (2013.01); *H04L 67/125* (2013.01);

(Continued)

(58) Field of Classification Search
USPC ................................ 709/223, 206, 218, 219
See application file for complete search history.

(56) References Cited

U.S. PATENT DOCUMENTS

| | | | | |
|---|---|---|---|---|
| 8,477,145 | B2 * | 7/2013 | Vembu .................. | G06F 9/4403 345/568 |
| 8,922,569 | B1 * | 12/2014 | Tidd ........................ | G06T 1/00 345/505 |

(Continued)

OTHER PUBLICATIONS

Beningo, Jacob "Building Reusable Device Drivers for Microcontrollers" available at http://www.embedded.com/design/mcus-processors-and-socs/4420068/Building-reusable-device-drivers-for-microcontrollers; Jan. 10, 2013.

(Continued)

*Primary Examiner* — Jude Jean Gilles
(74) *Attorney, Agent, or Firm* — Jason H. Vick; Sheridan Ross, PC

(57) ABSTRACT

Aspects are described for managing a network of things and applications that are distributed, such as geographically or globally distributed. One exemplary aspect of the system and method is based on a centralized cloud-based processing unit that implements a Rule Processing Application (RPA) and compiles a set of User Rules. The execution of the User Rules is distributed across a number of independent Decision Making Algorithms (DMA). Each DMA can be implemented in one or more devices (e.g., servers, gateways, processing units, etc.) distributed across the network such as a worldwide network. One exemplary method also utilizes gateways within Local Area Networks (LANs) with the characteristics that (i) each gateway communicates with a centralized cloud-based processing unit and (ii) each gateway can respond to commands from the centralized cloud-based processing unit to alter the gateway's functionality and implement a DMA (in whole or in part).

19 Claims, 22 Drawing Sheets

(52) U.S. Cl.
CPC ...... *H04L 67/2804* (2013.01); *H04L 67/2814* (2013.01); *H04L 67/2823* (2013.01)

(56) References Cited

U.S. PATENT DOCUMENTS

| | | | |
|---|---|---|---|
| 2008/0021680 A1* | 1/2008 | Elsberg | G06F 17/5004 703/2 |
| 2012/0075314 A1* | 3/2012 | Malakapalli | G06T 1/20 345/522 |
| 2012/0197870 A1* | 8/2012 | Simon | G06F 17/30448 707/722 |
| 2014/0053025 A1* | 2/2014 | Marvasti | G06F 11/079 714/37 |
| 2014/0184496 A1* | 7/2014 | Gribetz | G02B 27/017 345/156 |
| 2014/0194250 A1* | 7/2014 | Reich | A63B 24/0062 482/5 |
| 2015/0237071 A1* | 8/2015 | Maher | H04L 63/20 726/1 |
| 2018/0095541 A1* | 4/2018 | Gribetz | G06F 3/04842 |

OTHER PUBLICATIONS

Scratch; Available at https://scratch.mit.edu/; printed Mar. 28, 2016.

* cited by examiner

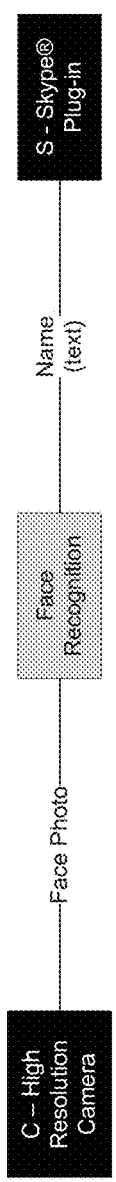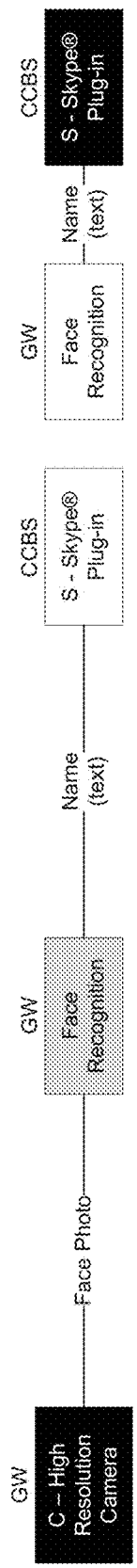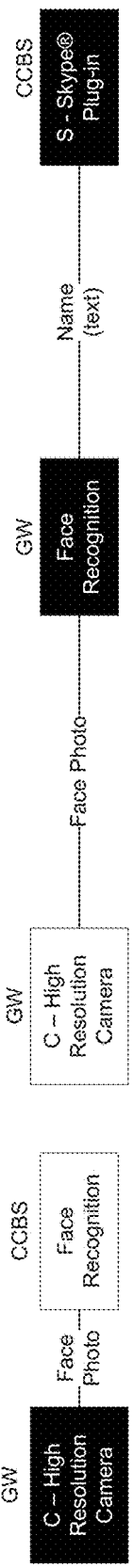

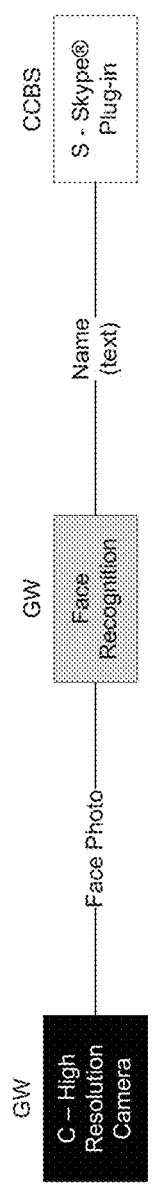
FIG. 10
FIG. 11
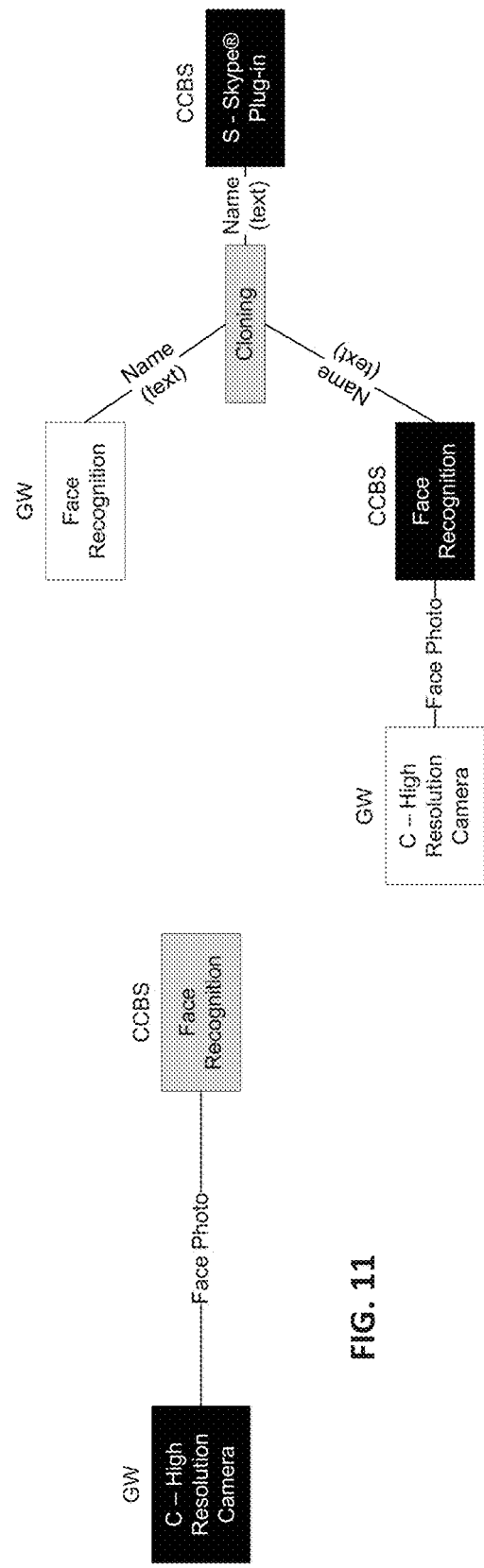
FIG. 12

PROGRAMMABLE DISTRIBUTED MANAGEMENT SYSTEM OF INTERCONNECTED THINGS AND APPLICATIONS

RELATED APPLICATION DATA

This application claims the benefit of and priority under 35 U.S.C. § 119(e) to U.S. Patent Application No. 62/139,375, filed Mar. 27, 2015, entitled "Programmable Distributed Management System of Interconnected Things and Applications," and U.S. Patent Application No. 62/248,743, filed Oct. 30, 2015, entitled "Application Agnostic MCUs (A2MCU) Using IoT Platforms," each of which are incorporated herein by reference in their entirety.

SUMMARY

In accordance with one exemplary aspect, a system and method are described for managing a network of things and applications that are distributed, such as geographically or globally distributed. One exemplary aspect of the system and method is based on a centralized cloud-based processing unit that implements a Rule Processing Application (RPA) and compiles a set of User Rules. The execution of the User Rules is distributed across a number of independent Decision Making Algorithms (DMA). Each DMA can be implemented in one or more devices (e.g., servers, gateways, processing units, etc.) distributed across the network such as a worldwide network.

One exemplary method also utilizes gateways within Local Area Networks (LANs) with the characteristics that (i) each gateway communicates with a centralized cloud-based processing unit and (ii) each gateway can respond to commands from the centralized cloud-based processing unit to alter the gateway's functionality and implement a DMA (in whole or in part).

This way, a distributed management system for network devices and applications is formed where a number of DMAs run on a number of gateways and other DMAs run on the servers of the Cloud system.

One exemplary method is topology-agnostic allowing the users to create rules for interconnecting devices and applications, as if all of them were located in the same network. This technique overrides network access restrictions by using the gateways as distributed executors in the LANs and allowing them to communicate through cloud servers or directly, using well known communication methods and protocols such as RESTful web requests, websockets, MQTT (MQ Telemetry Transport), AMQP (Advanced Message Queuing Protocol), etc.

One exemplary method also takes into account various service quality and reliability parameters to decide how to partition the logic functions and rules across a distributed management system of the Internet of Things.

One exemplary aspect also relates to a new hardware and software architecture of micro-controller units (MCU) of edge network devices. This new type of MCU, by leveraging the aforementioned distributed system, allows remote devices that execute the DMAs to get partial or full control of its internal hardware and software functions. In the following paragraphs, a detailed description is provided for the new MCU that is smaller (and thus less costly), with lower power consumption and fewer demands on battery life than previous MCUs. This new MCU is also user-friendly within an IoT system that is also described in detail, enabling access to previously difficult-to-obtain control and monitoring functionality related to the peripherals connected to the MCU.

The forecast for billions of network devices by the end of this decade could become true only if the right systems and methods are developed to offer simple and effortless ways of interconnecting them, even when they are not located in the same area.

Today, cloud computing servers support communication protocols to interconnect devices, while the servers themselves play mostly a proxy role. However, the users cannot really perform interconnections without significant effort since they have to develop applications based on the Application Programming Interfaces (APIs or apis) specified by the communication protocols and must enable their network devices to support those protocols in order to successfully interconnect.

Creating new applications to manage networks of things is costly and has arguably blocked the proliferation of IoT usage since some of them, especially those which deal with real time communication services, encounter challenges that take a long time to be overcome and years to reach mature levels of performance.

A successful system and method for interconnecting devices and applications should offer simple user interfaces and tools to enable all things to reliably and efficiently communicate with one another. In addition, such a system and method should devise and implement efficient algorithms to decide on commands to be sent to active network devices that may also be capable of processing data (such as lights, cameras, video cameras, appliances, etc.), based on events generated by network devices that act primarily as gatherers of information, or passive devices or sensors (such as motion sensors, light sensors, heat sensors, etc.). One goal is to reduce the complexity within the various active and passive network devices. This will in turn lower the cost of the devices and the services they provide as well as enable new types of services and capabilities.

One exemplary embodiment abstracts the concepts of devices and existing applications and, by treating each of them equivalently as endpoints with inputs and outputs, enables new methods and systems for interconnecting devices across diverse networks. There is a need for new software applications when the existing ones do not cover the requirements of new services, and new network devices should be developed to fulfill the requirements of new IoT scenarios. For example, a home thermostat within a LAN can be enhanced to distribute information to a distant network across the Internet for monitoring purposes and receive information from the same (or even another) distant network via the Internet for control purposes. New methods and systems can re-use the existing thermostat device and create a new IoT device and use-case applications. Similarly, an existing application, such as Skype®, Hangouts®, Facebook®, and others, can be enabled to be an integral part of the IoT. By doing this, the benefits, features and services of such applications can be utilized by the IoT, just as in the case of the thermostat.

Another exemplary embodiment relates to a system and method which offer a simple user interface to interconnect two or more digital systems, which may be physical devices or software applications, regardless of their position in the world through a cloud based system, while allowing smart distributed decision making algorithms to leverage the efficiency of the devices themselves, keeping their complexity and cost low.

Another exemplary embodiment relates to a new generation of generic purpose MCUs, designed in alignment with the idea of treating each single function of a network device as an individual Thing connected to the Internet or in general to a distributed network system. With prior systems, a typical MCU is a generic purpose programmable electronic circuit that executes data processing, handling of interrupts from external or internal sources, communication with external peripherals through the supported hardware interfaces and control of the operating modes of the system it is used in. For each application, a different code for each of the aforementioned functions has to be executed by the central processing unit (CPU) of the MCU. With the MCU of one exemplary embodiment, the programmability of all or some of its functions is transferred to other devices of a distributed network system. In that way, a large segment of the executable code remains unchanged regardless of the application the MCU is used in, while the remaining code has at least predictive boundaries. As a result, the new type of the MCU can be fabricated with the smallest possible size of programmable memory which has a profound impact on its silicon area and consequently its cost. Also, by transferring all programmability and intelligence to remote servers, less sophisticated CPUs can be used by the type of MCU as described herein since the complexity of the applications it can support is limited only by the capabilities of the remote servers.

BRIEF DESCRIPTION OF THE DRAWINGS

The exemplary embodiments will be described in detail, with reference to the following figures wherein:

FIG. 5 illustrates how an exemplary RPA algorithm will make use of exemplary logical steps;

FIGS. 6-7 illustrate an exemplary draft DMA for the gateway and another one for the CCBS;

FIGS. 8-9 illustrate exemplary graphs derived for the GW and the CCBS;

FIG. 10 illustrates the final steps of the exemplary process;

FIG. 11 illustrates the final steps of the exemplary process;

FIG. 12 illustrates the final steps of the exemplary process;

DETAILED DESCRIPTION

Figure 1:
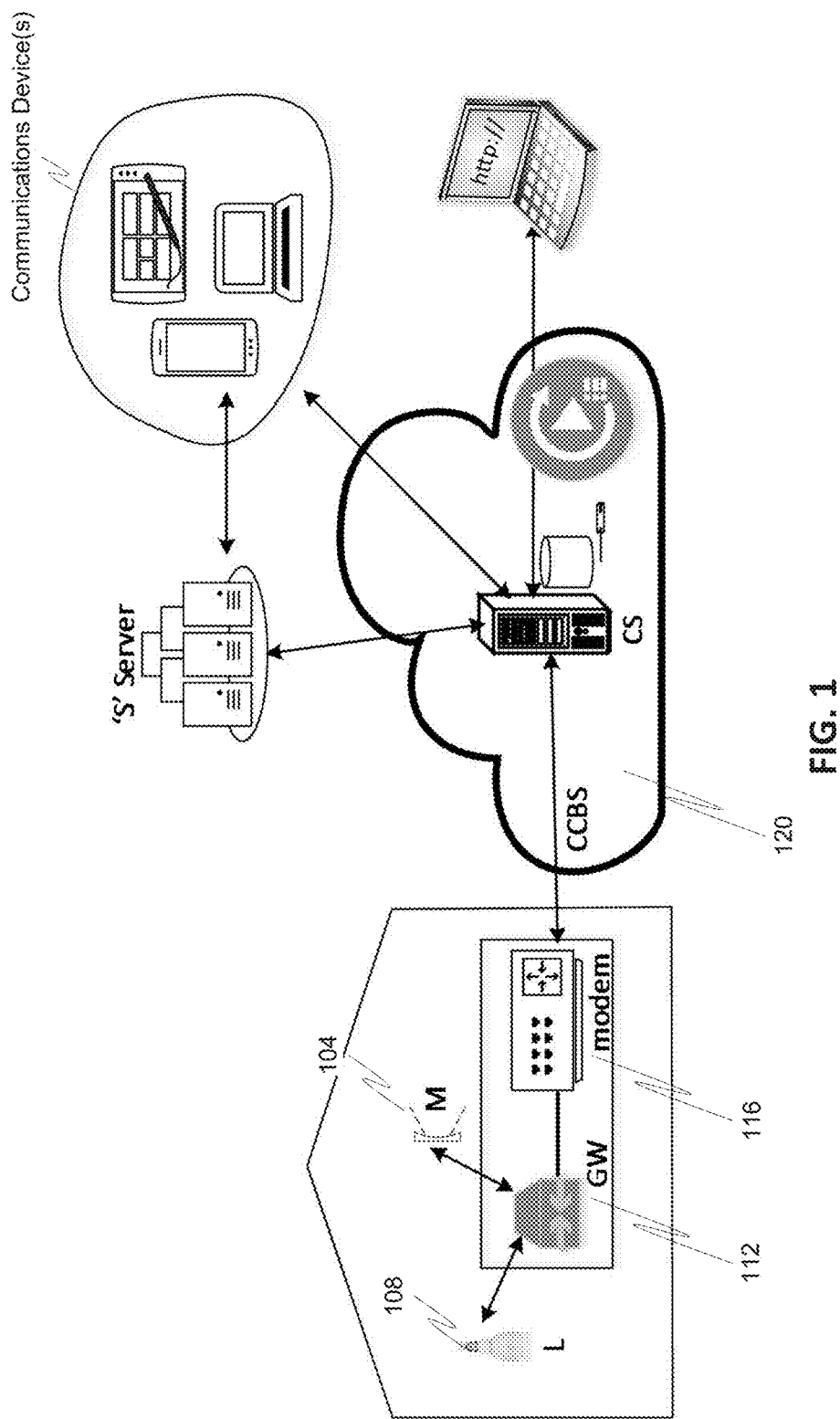
FIG. 1 illustrates an exemplary smart-home environment.

An exemplary embodiment relates to a cloud computing based system (CCBS) operating an application with an optional User Interface (UI). This application utilizes an engine, which, in a certain implementation method where the UI is a Graphical User Interface (GUI), could be a Graph Processing Engine (GPE) that analyzes the User Rules entered by, for example, the developers/managers/user(s) of cloud based services.

An exemplary embodiment also incorporates one or more remote processing units, the CCBS Gateways (CCBS-G) that can utilize the same GPE with the CCBS servers. One exemplary embodiment also incorporates CCBS Nodes (CCBS-N) which may not utilize the GPE. Both CCBS-G and CCBS-N are able to communicate with the CCBS server(s) over a network connection using a CCBS Protocol (CCBS-P) which can be based on signaling rules and specific packet formats.

As discussed herein, the term 'Thing' is used to denote a digital function which is not necessarily capable of communicating directly with the CCBS server, but requires a physical connection with a CCBS-G or a CCBS-N. The physical connection may be wired (e.g., an analog interface, a serial or parallel digital interface, etc.) and/or wireless (e.g., Bluetooth®, Wi-Fi®, Zigbee®, etc.) provided the CCBS-G or the CCBS-N can support the connection/protocol. In the generic case where the communication protocol over the physical connection is not the CCBS-P, but a Thing specific signaling and packet formatting protocol, the CCBS-G or the CCBS-N are also able to adapt to support the protocol, usually through software.

A Thing that supports the CCBS-P is a single-Thing CCBS-N and does not necessarily need any other CCBS-G or CCBS-N to reach the CCBS Server (CCBS-S) unless the single-Thing CCBS-N does not support the addressing of the Internet Protocol (e.g., a Bluetooth® 2.1 single-Thing CCBS-N) but in the case the CCBS-G or the CCBS-N becomes just a bridge between the Thing and the CCBS-S.

If the communication protocol used over the physical connection is the CCBS-P, then the Thing is also a CCBS-N. In this case, the CCBS-G or the CCBS-N the Thing is connected with, can be just a proxy to CCBS Server. A CCBS-N Thing does not necessarily need a CCBS-G.

An application running in (or in general, implemented by) the CCBS Server, hereafter called the Rules Processing Application (RPA), allows (optionally registered) users to specify rules (the User Rules) and then, by taking into account service quality criteria, create executable data processing functions known as decision making algorithms (DMA). Execution of the DMAs can be distributed among the CCBS-Gs and the CCBS Servers, i.e., the processing units capable of supporting the GPE. Either the CCBS-Gs or the CCBS Servers or both can execute the functions that process and exchange data with Things. The DMA can produce a sequence of commands and/or status information that are distributed to other applications or sent to network devices capable of processing data, and/or stored for future analysis.

The CCBS-G can comprise at least one processing unit, programmable non-volatile and volatile memory units. The CCBS-G may also comprise numerous wired and/or wireless interfaces through which the CCBS-G can communicate with one or more Things. A CCBS-G without wired or wireless interfaces may comprise two or more Things in the same physical device. A CCBS-G could comprise only one Thing but in that case, the GPE could be removed since there are not enough Things to communicate through a DMA locally executed. A CCBS-G without a GPE is simply a CCBS-N.

CCBS-Gs and CCBS-Ns can both serve the need to put dissimilar and CCBS non-compliant Things through the CCBS Server. Hereafter, the abbreviation CCBS-G/N may refer to either a CCBS-G or a CCBS-N.

The CCBS-G/N can be a cross platform module which means it can run in various combinations of hardware/Operating Systems (Linux®, Windows®, x86, as well as other Real Time Operating Systems.).

A CCBS-G/N, among others, can in accordance with one exemplary embodiment report periodically to CCBS Servers the list of Things that are active and accessible. Thus, the CCBS Server is informed if a Thing has been removed.

The GPE can manipulate Things, Logic Blocks (LB) and databases, referred hereafter as Graph Building Blocks (GBB). A LB is a function represented in the GUI as an object with inputs and outputs which can be incorporated by the graphs to process data originated by one or more Things and produce output data that feed other Things LBs and/or are stored to databases.

The GPE is upgradeable with its new version supporting a longer list of GBB. A CCBS Server should be able to support the full list of GGB that the latest GPE version supports.

A GPE running on a CCBS-G can be configured to support a subset of the Graph Building Blocks that the latest GPE version supports. For instance, most CCBS-Gs do not need to support databases. In another example, a CCBS-G with limited processing power may not support an image processing LB that has to run on powerful computing systems to provide real time response.

A typical example of the RPA algorithm which breaks a set of User Rules (generated from a User Story) into a number of DMAs, which will be distributed from a CCBS Server to various CCBS-Gs, is provided in the following paragraph.

FIG. 1 is referred to for better comprehension of the benefits of one exemplary embodiment in a smart home environment where the following devices have been installed:

a Thing (M) 104 which is a Human Motion Detector,
a Thing (L) 108 which is a smart bulb able to connect to the network through a wireless or wired interface,
a CCBS-GW (GW) 112 with which Things M and L are connected,
a modem 116 through which the GW can access the CCBS Server 120 (in some cases, the modem and the GW may be a single device).

As one example, an administrator of the smart home installation wants to implement the following User Story: When human motion is detected, turn on the smart bulb 108 for 10 seconds and send a message to an account of a communication application like Skype® or alternate Session Initiation Protocol (SIP) communications protocol for Internet telephony for voice and video calls or instant messaging or in general any messaging system and/or protocol.

In accordance with one exemplary embodiment, the administrator maintains an account in the CCBS and the GW 112 has been registered to this account. The GW 112 puts M 104 and L 108 Things through the CCBS Server 120.

Figure 2:
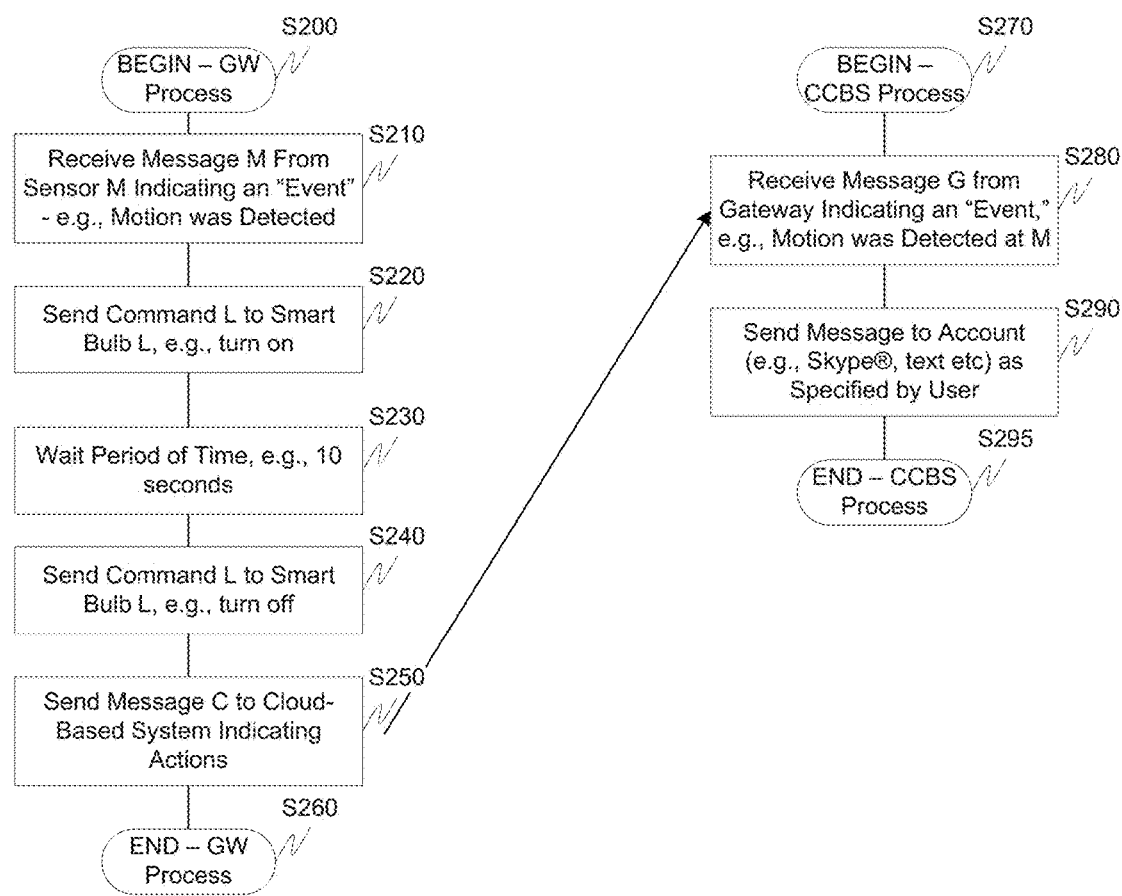
FIG. 2 is a flowchart illustrating one exemplary method of operation of the GW and CCBS.

Upon sign up, the administrator can enter the User Rules for M, L as well as the Skype® account or other communication modality account information and then deploy the User Story. The RPA will then parse the User Rules and since M and L are both Things of the same CCBS-G, but accessing a Skype® needs communication with a 3rd party server (S) through the CCBS, will create two split DMAs, one that will be executed by the GW and the other by the CCBS Server. For this particular User Story, the GW and the CCBS execute the following actions as illustrated in FIG. 2:

In the GW, after control begins at step S200, a message is received from the sensor M indicating an event, such as motion detection in step S210. Next, in step S220, a command is sent to another Thing such as a smart bulb. Then, in step S230, and in accordance with this exemplary scenario, a period of time passes. Control then continues to step S240. In step S240, a command is sent to the Thing, such as the smart bulb, to turn off. Control then continues to step S250 where a message is sent to the CCBS indicating the actions that occurred. Control then continues for the GW to step S260 where the control sequence ends.

Control for the exemplary CCBS process begins in step S270 and continues to step S280. In step S280, a message is received from the gateway, the message indicating the event information that took place. Next, in step S290, a message is sent is accordance with the programmed protocol to one or more destinations, such as a smart phone, email, or in general any destination in any format using any protocol. Control then continues to step S295 where the control sequence ends.

As it is easily realized from the description of the above use case, the flexibility of a distributed management system for the Internet of Things, comprising cloud servers external to and programmable gateways internal to the local area networks where the network devices are physically located, offers significant advantages compared to other methods.

With typical prior systems, decisions are made through processes running only locally. In other words, all the processing regarding decision making is performed within the local area network which is connecting the devices for which decisions are being made. This processing could be implemented in a gateway or on another computing system that resides in the network. In the above example, all of the operations would be performed, for example, by the gateway as opposed to being split between the gateway and the cloud system. This would mean that the gateway would also need to perform the Skype® (or related application(s)) messaging, which is problematic because the gateway does not normally perform this type of function and would need to be specially configured to do so.

Also, access to the gateway inside the LAN may be constrained, and imposing User Rules (which need to be able to be modified easily by the User) would require significant changes to the access and control of the gateway. Using the exemplary system and methods as discussed herein, the advantages of using an alternate application, e.g., the Skype® network or other(s), for interconnection is enabled by distributing the appropriate processing to the cloud system.

In other prior systems, the entire process can be implemented in a cloud-based system. In this case, all of the functions depicted in the flowchart above would be performed in the cloud based system. Specifically, the cloud based system would need to directly receive the message M from the sensor M (as opposed to a translated message G from the gateway that may be made to conform to the cloud based system's constraints). Also the cloud based system would need to be able to communicate directly with smart bulb L using the exact format of command L (which may differ from one type of bulb to another).

In addition to the complexities arising from the communications protocols that the cloud based system would need to adhere to, there are also complexities relating to access to the devices in the local area network (in this example sensor M and smart bulb L) to and from the cloud-based system. Using the exemplary technologies discussed herein, the advantages of using local processing (in this case the gateway) for actions to be performed locally (e.g., receive message M, send command L) can distribute the complexity of these actions to a place where they are easily addressed. Another advantage is that the technology overcomes the challenges of accessing the devices from outside the network since CCBS-G maintains a connection with CCBS-S.

Another exemplary aspect of the technology is that the distribution of the executing actions can be made dynamically based on, for example, the capabilities of the executors and/or other metric(s).

In accordance with one exemplary embodiment, the CCBS is informed about the GPE capabilities of each registered CCBS-G. As mentioned in previous paragraphs, each CCBS-G may support a subset GBB of the latest full GPE version. The system offers full flexibility to administrators to build the GPE for a certain CCBS-Gs. For instance, the administrator may decide not to include a specific LB or disable it in the GPE version that will be built for a CCBS-G, even if the LB receives data from one Thing (Originator) that is connected to CCBS-G, processes them and feeds another Thing (Actuator) that is connected to the same CCBS-G.

Consider the following example:

The Originator is a camera, the LB is a complex image processing function and the Actuator is a screen where the output of the image processing algorithm is displayed. The LB may need high processing power, making the CCBS-G unable to deliver results in reasonable time.

If the administrator does not include the LB in the GPE version of the CCBS-G, the RPA will decide that this complex function should be executed by the CCBS Server instead of the CCBS-G. As it is easily realized, if the CCBS Server is powerful enough to support complex image processing, the difference in processing time between the CCBS-G and the CCBS Server might be several minutes, hours or even days, much higher than the network transmission delays. Thus, the choice of running this algorithm on the CCBS Server instead of the CCBS-G would be a wise one.

On the other hand, for certain applications, reliability may be more important than response time and processing delays. If long response time is less important than the avoidance of a failure in the execution of the LB due to—even the unlikely event of—an internet outage, the administrator could enable the LB function in the GPE version of the CCBS-G and the RPA could assign the DMA for the LB function to the CCBS-G.

In another embodiment, the RPA makes a decision based on Users Rules to clone and force parallel execution of a DMA by more than one DMA executor. In the previous example, the LB of the complex image processing block may be executed on both the CCBS Server and the CCBS-G for the same input of the originator. If the CCBS Server always returns results for the Actuator faster than the CCBS-G, then the corresponding processing task of the CCBS-G will be cancelled.

In yet another embodiment, the RPA makes a decision that the CCBS Server shall be utilized to execute more complicated processing functions and that the output of this should feed simpler processing functions of one or more local DMA executors (CCBS-Gs). There are always functions and requirements that the local DMA executors can handle better than the servers of the CCBS in such a distributed management system for IoT. The benefits of this approach are especially obvious in battery driven edge network devices, like wireless sensor nodes, that should not be in operating mode all the time (i.e., not always on) so that they can function over longer periods of time. A CCBS-G could contribute to extending their battery life in various ways. For instance, the CCBS-G can defer the transfer of the DMA output until the target devices are awake, information that could not be reliably known to the cloud-based server but is readily available to the CCBS-G. This is another example of why distributing functions to processing units within the LAN (the CCBS-G in this case) provides important benefits to the functionality of the IoT network, in this case preserving battery life and improving the viability of the network for the user.

In another embodiment, the RPA may decide to repartition the DMAs without any user intervention, when the network conditions change. Examples of network condition changes include:

A portable Thing is disconnected from one CCBS-G and is connected to another or directly to CCBS, in case the Thing is also a CCBS-N.

The CCBS-G goes offline and its associated Things are connected to another CCBS-G.

An update of the GPE of the CCBS-G that affects the LBs which are utilized by active User Stories.

In the example where the camera was the Originator, the LB was a complex image processing function and the Display was the Actuator, we can consider that originally the LB was running on the local DMA executor, the CCBS-G where both Things were connected. We can consider now some of the following network condition changes that will all result in a repartitioning of the DMAs by the RPA:

1. The Originator is a mobile device (e.g., the camera of a mobile phone) which is connected to the CCBS-G over Wi-Fi. We also assume that the Originator is a CCBS-N. The device is moving out of the range of CCBS-G, losing its connection, and finds another hot spot which puts it through the CCSB. This is possible since the Originator is a CCBS-N. The first time after the disconnection the CCBS-G will report to CCBS the updated list with its associated Things, the RPA will be reactivated and will repartition the DMAs enabling the functionality of the LB on the CCBS Server and disabling it on the CCBS-G.

2. The Originator is the camera of a mobile phone which is connected to the CCBS-G over Wi-Fi. We also assume that the Originator is a CCBS-N. The Actuator is the Display of another mobile phone which is also connected to the CCBS-G over Wi-Fi and is a CCBS-N too. Due to a power failure, the CCBS-G goes offline and stops responding or sending data to CCBS. Both the Originator and the Actuator find a way to communicate with the CCBS through another hot spot or their mobile operators. The RPA in this case will be reactivated to repartition the DMAs to enable the functionality of the LB on the CCBS Server.

In yet another embodiment, the RPA may decide for the partitioning of the DMAs, based on service quality related parameters, such as:

Overloading of the CCBS-G: For instance, if in a User Story, there are several instances of a complex LB which could all be executed by the same CCBS-G but would make its response time low, the RPA will decide how many instances of the LB should be executed by the GPE of LB, the CCBS-G, and the rest will be deployed in the CCBS Server. The decision may be user driven or machine driven e.g., the CCBS-G may report the processing time required per instance and the user may just declare the worst response time that can be accepted by the application.

Network delays: Both the CCBS Server and the CCBS-G can measure the packet turnaround time when they send packets to each other over the network and await for response. If the quality of the network connection results in a turnaround time higher than the application specific maximum acceptable turnaround time, LBs may be better to be executed by the CCBS-G. Network quality parameters may be calculated separately for uplink and downlink which for some applications is important (e.g., big photos are sent up to the cloud and small packets are sent from the cloud down to an edge device containing the results of image analysis algorithms)

Further embodiments comprise multiple CCBS-Gs able to execute in parallel DMAs of a single User Story after the partitioning from the RPA. Those CCBS-Gs may be distributed to several independent LANs and each one of them can communicate with a set of Things in its LAN. In the following example, we assume that several CCBS-Gs are registered to the same user's account in the CCBS. This embodiment also comprises a RPA algorithm in the CCBS which decides how to split the User Story and distribute its portions to the CCBS-Gs. This embodiment can be better explained with reference to FIGS. 3 and 4.

Figure 3:
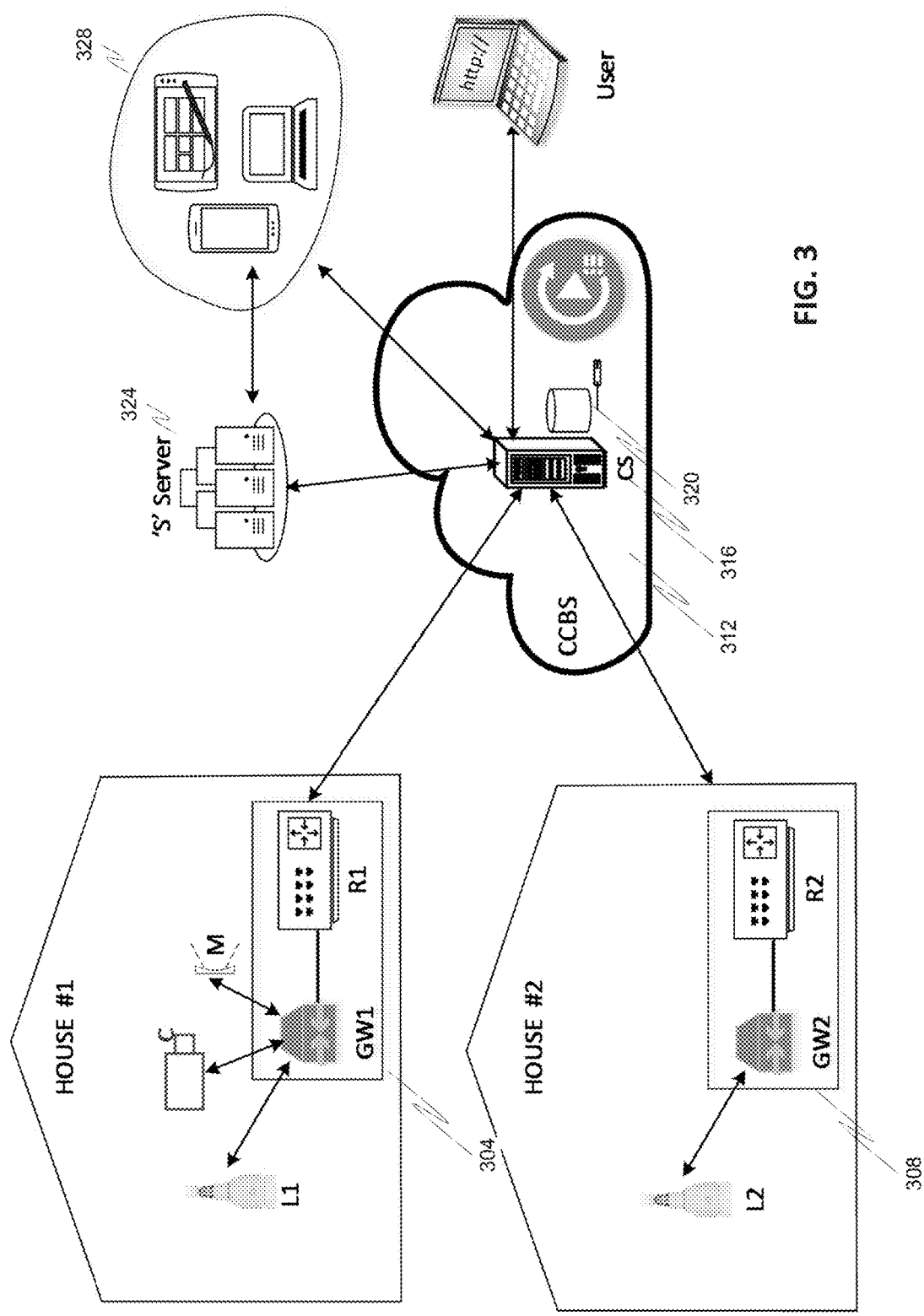
FIG. 3 shows an exemplary topology of two CCBS-Gs, GW1 and GW2.

FIG. 3 shows the topology of two CCBS-Gs, GW1 304 and GW2 308, which play the role of DMA executors in the LANs of House #1 and House #2, respectively. Both CCBS-Gs are registered to a single user's account in a CCBS 312. In the real world, this may represent the case of a person who keeps a single account in the CCBS in order to control the primary residence in House #1 and the user's summer house, House #2. The user wants to manage, control and interconnect the Things of both LANs through configurable DMAs that derive from a set of rules i.e., a User Story.

The CCBS comprises at least one cloud server (CS) 316 (FIG. 3 depicts just one, but additional CSs can exist within on CCBS) where the RPA is running and DMAs for multiple users can be executed. It also comprises storage devices 320 here users' accounts and data are saved. The CCBS also supports interfacing with other servers outside this system that run applications with which the users with accounts in the CCBS may want to connect their network devices. In FIG. 3, the CS of the CCBS supports communication with external servers (S) 324 which host applications that devices like mobile phones, tablets, PCs 328 and others can also use.

The current example assumes the 'S'-Server is one that runs a communication application. A user with an account (according to one exemplary embodiment of the system and methods disclosed herein) on the CCBS wants to interconnect network devices, Things and/or CCBS-Ns according to the definitions described herein, located in the LANs of two houses through a DMA that fulfills the requirements of a User Story. In addition, this same user maintains an account with, for example, a Skype® service and wants to transmit and receive data to and from a Skype® application that runs on the user's computing device (which could be a smartphone, tablet, laptop, PC, desktop, wearable, automobile, etc.). The data may be text, file and/or video/multimedia which is produced by the DMA. The user may also want to be able to produce inputs for the DMA by sending data to Skype® in order to control and manage Things and CCBS-Ns in any location.

Inputting the User Story

Figure 4:
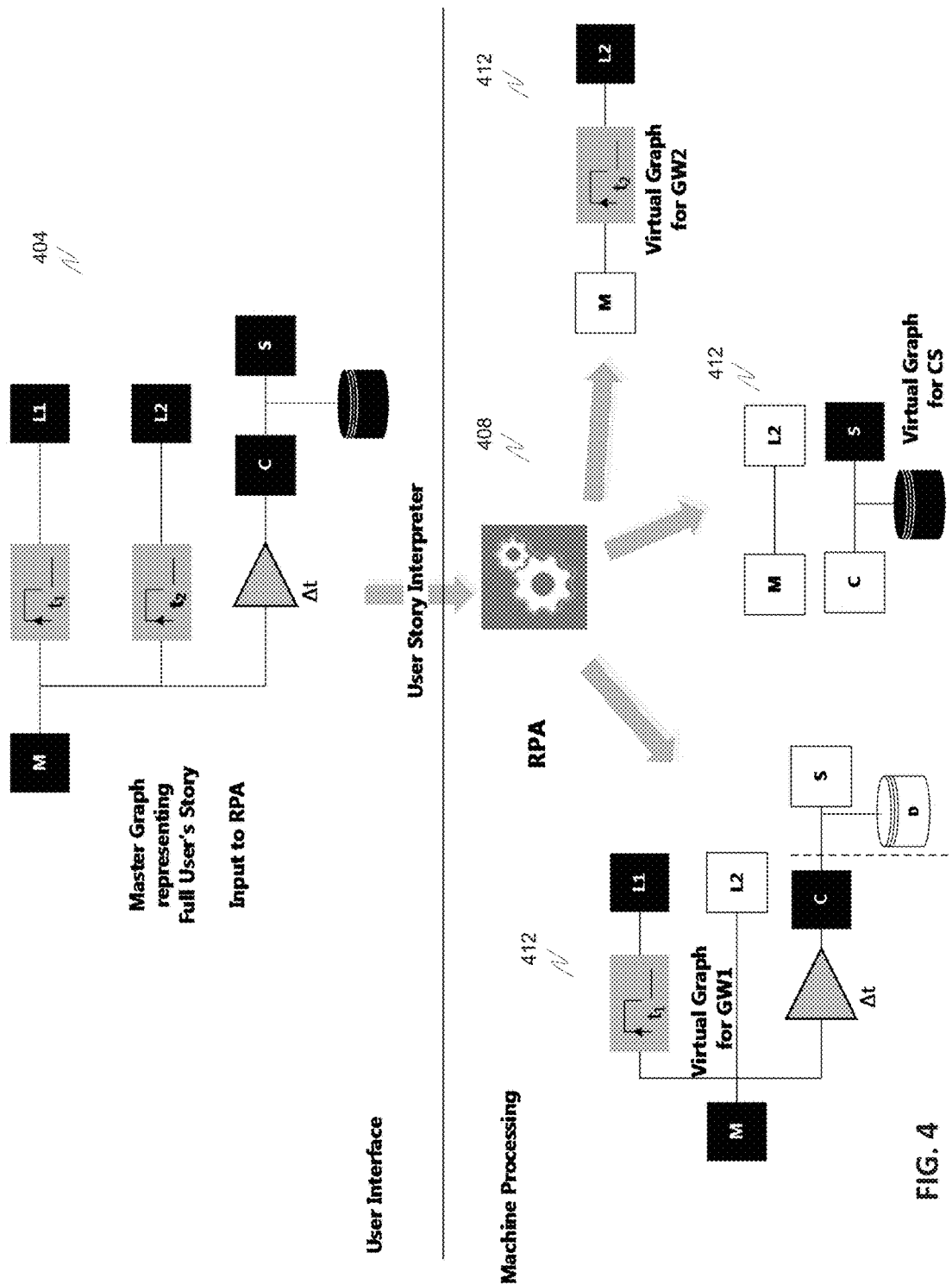
FIG. 4 illustrates exemplary graphs illustrating a user story.

One exemplary way a User Story will be entered and stored to the CCBS in order for the RPA to process it and create a distributed set of DMAs, which can be executed across the network of available resources in both the CS and within the CCBS-Gs, can be explained through FIGS. 3 and 4. The user will access the CCBS account from a computing device like the laptop shown in FIG. 3. An application running on the computing device and/or a web based environment supported by CCBS will offer an entry interface for the rules which compose the User Story. The entry interface can be graphical, textual or other but for sake of simplicity an interface based on graphs that connect the registered network devices and 3rd party applications through logical blocks has been selected, as shown in FIG. 4.

The graph representing a full User Story is shown in the upper part of FIG. 4. The User Story can be described as follows:

"When human motion is detected and the corresponding event is generated by the sensor M, do the following:
 a. turn on L1 bulb of House#1 for $t_1$ seconds,
 b. turn on L2 bulb of House#2 for $t_2$ seconds,
 c. take a picture from camera C after $\Delta t$ seconds ($\Delta t < t_1$),
 d. store the picture and also send it to my email/text/Skype® account (S server)"

The User Story is described with Rules. As illustrated in FIG. 4, connections between icons which represent network physical devices, applications and logic blocks as well as parameters of logic blocks (e.g., $t_1$) each constitute a Rule.

Once the user has programmed all the Rules, the User Story can be saved. In FIG. 4 the User Story is shown by the Master Graph 404 in the upper half of FIG. 4. The User Story is subsequently interpreted by the Rules Processing Application (RPA) 408 which resides on and is executed within one or more cloud servers (not shown). The interpretation of the User Story by the RPA is allowed to be an iterative process whereby warnings and/or errors are created by the RPA and fed back to the user, who then can modify or updates the master graph of the User Story until both the user and the RPA are in agreement on what the User Story consists of. At this point the RPA provides an error free output indication to the user.

The RPA engine utilizes the error free output of a compiled User Story and generates sub graphs 412 that correspond to tasks to be executed by the CCBS-Gs of the various LANs and CCBS Server(s).

Those graphs are shown in exemplary form in the lower part of FIG. 4. In these graphs, GW1 designates the CCBS-G associated with House 1, GW2 designates the CCBS-G associated with House 2, CS designates server CCBS Server. The master graph of the upper half of FIG. 4 has been distributed to three separate virtual graphs, each implementing a subset of the full User Story.

In particular, for the distributed network of Things shown in FIG. 3, the gateway of House#1 shall execute the tasks implied by the "Virtual Graph for GW1" shown in FIG. 4. GW1 is a local executor of a part of the DMA that corresponds to the User Story of FIG. 4.

Specifically, when the motion detector of House#1 which is shown in the graph as Thing M generates an "event", it triggers the GW1 to keep the bulb, shown as Thing L1, on for t1 seconds by sending the appropriate commands for turning it on and off t1 seconds later. Locally (within House 1) this is done with commands sent and received between devices within the local network, i.e. between GW1, M and L1. GW1 must also forward the occurrence of this "event" from detector M to bulb L2. Note that GW1 may not know where L2 is located or what L2 is. It does know that it is not located in the LAN of House#1 (and thus that it is a network device out of its local network). GW1 forwards the "event" tagged with an ID of M to the server of CCBS. The last task that GW1 executes due to the "event" from M is to get a picture from a security camera C and forward it to the CCBS, since it does not understand where and what the network devices symbolized by S and D are, as shown in FIG. 4.

Network devices or applications (Things) outside the territory of a local DMA executor are shown as white squares in FIG. 4 outlined with black line while those within their territory are shown with black squares. LBs are those filled with grey.

The second graph generated by the RPA engine corresponds to the DMAs that are to be executed on the CCBS. As shown in the "Virtual Graph for CS" of FIG. 4, the CCBS is responsible for:

a. forwarding the incoming event message tagged with an ID of M to L2. The CCBS, in contrast to the CCBS-Gs of the various LANs, is aware of the position and the type of device that L2 is since it maintains a list with the Things per account and their location.

b. storing the incoming pictures tagged with an ID of the security camera C to storage devices of CCBS, and c. forwarding the picture to a CCBS internal processing unit which is responsible for communicating with the S server (S plug-in) and sending the pictures to the user's requested destination(s) (e.g., Skype® account) on behalf of a virtual account handled by CCBS.

An exemplary embodiment of the CCBS can use such plug-ins to communicate with third-party application(s) running on external servers to CCBS. So, with the use of plug-ins, large scale applications can be leveraged to expand the capabilities of CCBS with well proven services.

The third graph generated by the RPA engine corresponds to the tasks that are to be run on GW2 of House#2. As shown in the "Virtual Graph for GW2" of FIG. 4, for the User story of our example, GW2 will run only one task: at the reception of an event message tagged with the ID of M, it will turn on bulb L2 of House#2 for t2 seconds.

The RPA Algorithm/Process

In accordance with one exemplary embodiment, the algorithm of the RPA, which is responsible for the distribution of the executing actions among the CCBS-Gs and the CCBS, is based on logical steps with the following exemplary order:

1. Start with the assumption that all User's Rules should run on the CCBS-G provided that its GPE supports the required LBs. The goal is to offload the cloud servers of CCBS (the "Locality" condition) whenever this is possible and let the CCBS either idle or act as a bridge between networks to propagate data.
2. If there are Users Rules tagged by the user to be executed by a specific "executor", apply such a Rule. The user is able to select at least any of the following options for the execution of rules:
   a. Auto (don't care)
   b. Local (gateway)
   c. Cloud
3. Transfer executing actions from CCBS-Gs to CCBS when the reported gateway capabilities are not enough to support those actions (long processing times, not enough memory, etc.). The RPA may generate warnings or errors in case the locality condition of the previous step cannot be applied due to gateway limitations (such as processing power or memory).
4. Optimize the distribution of executing actions based on bandwidth restrictions, by moving actions from the CCBS-G to the CCBS
5. Clone user rules to run both locally (CCBS-G) and on the cloud if, due to 4 above those have been moved to CCBS and if the user has requested cloning for additional reliability.

The following example (with reference to FIG. 5) shows how the RPA algorithm will make use of the logical steps described above: A high resolution camera 510 takes photos of faces which are then sent to an image processing function 520 that recognizes the face among a number of photos and sends a text message with the name of the person in the photo to destination(s) (such as a Skype® account) through the Skype® Plug-in of the CCBS. The graph of the User Story is shown in FIG. 5.

The RPA will initially apply the locality condition and will set a gateway tag to the "Face Recognition" (FR) block. It will also take into account the user's preference for the executor of the FR which in this example is assumed to be Auto (don't care). After the first two steps, the RPA will produce a draft DMA for the gateway and another one for the CCBS (shown in FIGS. 6 and 7, respectively)

Then, the RPA algorithm will consider the system resources in contrast to the CCBS-G capabilities or the processing time the GGPS-G requires to execute the Face Recognition algorithm. In this particular example, we assume that the CCBS-G is insufficiently powerful to run the "Face Recognition" algorithm or to return results within the time limits the application requires. The RPA therefore decides to transfer the execution of FR to CCBS. The graphs derived from this step for the GW and the CCBS are shown in FIGS. 8 and 9.

In this example, there are pros and cons with the placement of the FR at the GW or at the CCBS. When the FR is placed on the CCBS, there is enough CPU power and memory to meet the requirements of the execution time. On the other hand, for every HD photo, several Megabytes of data need to be transmitted to the cloud as opposed to the case where the FR is executed by the GW which requires just a few bytes of data to be transmitted, e.g., the name of the person in the photo to, for example, a Skype® plug-in. However, the GW may not have adequate processing power to execute the FR algorithm within the quality or time constraints specified.

In the final two steps shown in FIGS. 10-12, the RPA will optimize the DMAs based on reliability. The user may select high reliability and cloning so that the GW and the CCBS Server will both execute the FR. The CCBS will receive the text from the FR of the GW but will also execute the FR and generate text. A cloning logic could also optionally be added to CCBS by PRA to avoid double message propagation to the Skype® Plug-In, simply by blocking the 2nd text that arrived either from the FR-GW or from the FR-CCBS functions.

Description of an Exemplary CCBS Gateway

Figure 13:
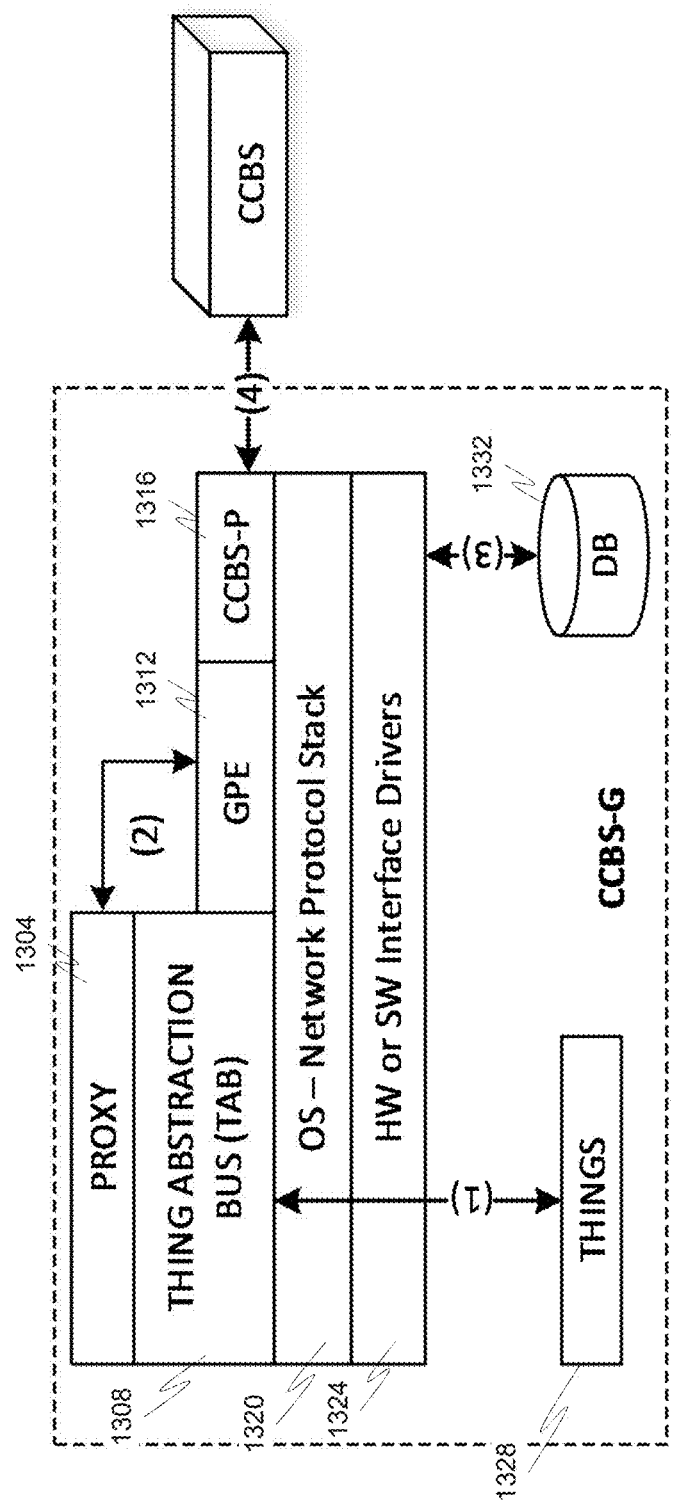
FIG. 13 shows an exemplary CCBS-G software arrangement.

The exemplar CCBS-G comprises, in addition to the components shown in FIG. 13, (including proxy 1304, Thing Abstraction Bus 1308, GPE 1312, CCBS-P 1316, an operating system 1320, drivers 1324, Things 1328 and a database 1332) at least one processing unit, programmable non-volatile memory, temporary memory units and at least one wired and/or wireless interface.

The exemplary CCBS-G shown in FIG. 13 undertakes at least the following: (i) translating the heterogeneous protocols used by Things to a common protocol used within the CCBS and (ii) executing part of or the whole DMA configured by the user.

The exemplary main features of the CCBS-G are:

Thing Abstraction: A Thing may be a physical device and/or a Software function and may be CCBS protocol enabled (CCBS-N), or not. In the latter case, an abstraction layer is required with respect to the interface specification of the Thing, in order to bridge the communication barriers with the CCBS.

Communication with the CCBS: The CCBS-G should 'speak the language of CCBS' and for this reason it should support the CCBS Protocol (CCBS-P).

Embedded GPE: Things connected to CCBS-G may be managed locally by the embedded version of GPE. The embedded GPE may be responsible for any of the following types of data handling:

Logging: Data from things may be stored locally, based on the DMA configured by user.

Analysis: Data from things may be analyzed and filtered based on the DMA configured by user.

Control: Things can be locally controlled as a result of a DMA.

The CCBS-G specific software as shown in FIG. 13 includes (i) the Thing Abstraction Bus (TAB) and a proxy entity, (ii) the embedded GPE, (iii) the CCBS-P and (iv) a local database.

The TAB module translates the heterogeneous protocols of connected things to a simple events and commands bus protocol which is published to GPE through a proxy.

Let's assume for example a scenario where four things are connected to the gateway (i) a brand A hue light bulb named L1 (ii) a brand B light bulb named L2 (iii) a weather service that contains temperature measurement named T1 and (iv) a temperature sensor named T2. The TAB and proxy modules can provide a common way of issuing commands to these things through a representational state transfer (RESTful) API of the form:

/cmd/{device id}/{command}.

To switch both bulbs off in the example above the DMA Logic will issue the commands:

/cmd/L1/off and /cmd/L2/off.

The TAB module will translate the first command to an http put request used by the L1 and the second command to a serial RS485 packet used by the L2 in order to control the two devices. On the other hand, the TAB module will capture events (temperature values) by polling for the T1 a http service and for T2 a register value on the RS485 bus and publish them, to DMA Logic, through a RESTful API of the form:

/event/{device id}/{value}.

In this exemplary scenario, for T1 temperature of 36.2 and T2 temperature of 35.1 the following events will be created: (i)/event/T1/36.2 and (ii)/event/T2/35.1, respectively.

This modular approach with the TAB/proxy module makes it possible to use any abstraction layer from any 3d party automation framework with no or little changes to the proxy module.

As an example, the TAB module can be developed from scratch or with the appropriate proxy module the core of the open source openhab (OH) or eclipse smart home (ESH) projects can be used as TAB module for the gateway. OH and ESH cores are based on a cmd and event bus and an item repository that supports hundreds of devices of the market, called bindings, like hue lamps, wemo switches, music players (e.g., Sonos® players), smart tv's, etc. In this way, the gateway can take advantage of open source community development efforts and other advances performed by others.

The GPE provides the intelligence to execute the DMAs that are ordered by the RPA of the CCBS or simply control the traffic between the Things and the CCBS.

The CCBS-P takes care of all the communication with the CCBS. It is also responsible for the periodic reporting to CCBS of the quality parameters, the list of connected Things and supported LBs as has been described in previous sections. The communication protocol can be CCBS specific.

Any of the four aforementioned CCBS-G specific modules can be upgraded or configured from the CCBS. For instance, the embedded GPE can be upgraded or ordered to enable/disable some of the LBs it supports.

In another exemplary embodiment, when a generic purpose MCU of a network device allows the DMA executors running on network servers to gain full or partial control of its functions, application dependent code can be eliminated. This is achieved by assorting the functions of an MCU into Things, which can then be utilized by User Rules. In that way, all the intelligence of the edge network device is transferred from its MCU to powerful CCBS Servers or CCBS-Gs, making the MCU Application Agnostic (A2MCU).

To transform any MCU to an Application Agnostic one, the MCU should become a CCBS-N for its functions.

The following section describes how this can be done and the improvements that an exemplar embodiment is presenting compared to traditional MCUs.

Figure 14:
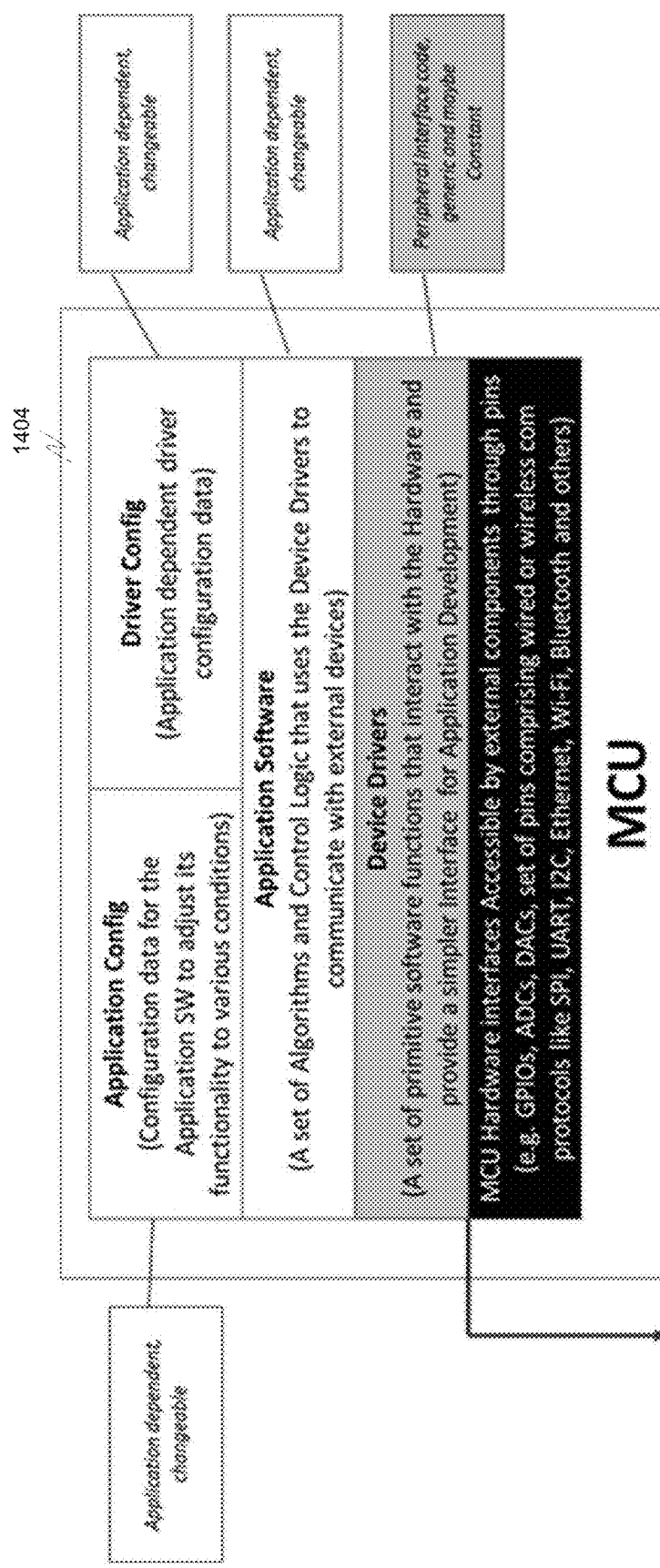
FIG. 14 shows a legacy layered software organization in a reprogrammable MCU.

FIG. 14 shows a typical architecture (hardware and/or software) for an MCU 1404. In FIG. 14, the Legacy Layered SW Organization in a reprogrammable MCU is shown (see for example http://www.embedded.com/design/mcus-processors-and-socs/4420068/Building-reusable-device-drivers-for-microcontrollers for a more detailed description, which is incorporated herein by reference in its entirety).

In FIG. 14, the color coding of the blocks means the following:

Changeable (software blocks with white fill): The code may be stored in Flash, internal or external memory. If a parallel bus is used to access the Flash, the Central Processing Unit (CPU) of the MCU may execute the code directly from the Flash. If a serial bus is used by the CPU to access the Flash, it is very likely that the code is initially fetched into an SRAM and it is executed from there. Both methods are not recommended for low cost, low power MCUs for applications like Wireless Sensor Networks. The 'Changeable' SW in a legacy MCU is mainly application dependent and it is usually the one which may be multiple times bigger in size (number of bytes) than the Constant one.

Constant (software blocks with grey fill): Refers to code that is tightly coupled with the hardware blocks and as long as those do not change, a well-tested code that drives them does not need to change as well. Such a code could be stored in a ROM by the manufacturer. Optionally, a small RAM could be provided for patches to this code.

In order to make the MCU application agnostic (A2MCU), the following should occur:

All the functionality of the changeable Software (Application SW, Application and Driver Configuration) must be transferred from the MCU of FIG. 14 to one or more remote servers. For the sake of simplicity in the description of the A2MCU, we will consider the case that the functionality of the changeable Software is served only by one remote unit which can be a CCBS-G or a CCBS Server.

The MCU should become a CCBS-N. To accomplish this, the following software entities should be added:
  A. A Thing Abstraction Bus (TAB), similar to the TAB of the CCBS-G described in a previous section.
  B. A Proxy entity, similar to the one of the CCBS-G described in a previous section.
  C. The CCBS-P entity to make the MCU speak the language of the CCBS. The functionality of the CCBS-P is to that of the same entity of the CCBS-G.

The CCBS-P Layer may need a small amount of reprogrammable configuration data like for instance the address of the CCBS to communicate with. This may be stored in a small non-volatile memory inside or outside the A2MCU and can be considered as a replacement of the local database of the CCBS-G.

The CCBS-P Layer of the A2MCU is responsible for communicating with the CCBS Server through the network driver of the A2MCU and over the network channels (more information about different network configurations is provided below)

With conventional methods of MCU software application development, the Hardware Peripherals are accessed by making use of their drivers' API. With one exemplary embodiment, the CCBS-P exposes each peripheral as a "Thing" to the IoT Platform Layer on the CCBS.

The Application Software on the remote server makes use of the IoT platform Layer and the framework it offers for interconnecting Things through logic with 3rd party Services or other Things.

Upgradeability for a CCBS-N like the A2MCU may not be so important for the following reasons:
  D. The Things to be controlled by the CCBS are on-chip and fixed. Thus, the TAB, made and verified once, does not need to change.
  E. There is no embedded GPE, like in the case of a CCBS-G.

By linking the three new Software entities required for the A2MCU with the Device Driver and other Software Management Functions that are also considered as Things (e.g., Interrupt Handler, Power and Clock Management blocks, etc.) and then compiling them, a binary program code is generated that can be stored in a ROM. The benefits from this are analyzed in following sections.

Figure 15:
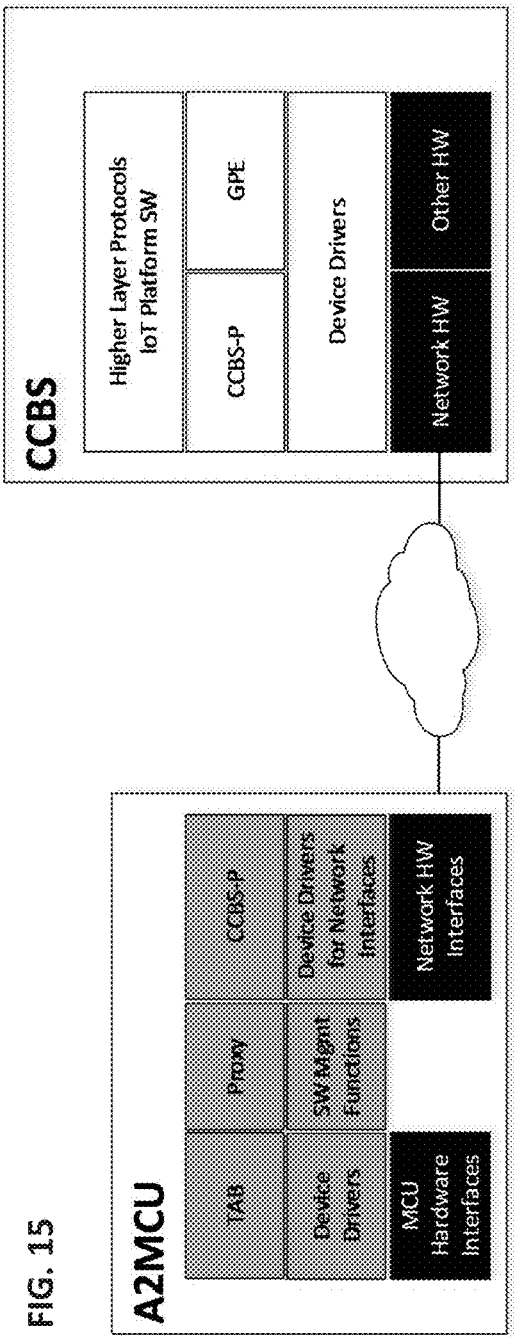
FIG. 15 shows an exemplary system supporting the A2MCU.

FIG. 15, shows an exemplary system supporting the A2MCU as connected to a CCBS. By analyzing the figure, the following aspects are worth noting:

The Remote Server of CCBS may be any computing device with network interfaces.

In addition, the system runs an operating system which provides mechanisms to access its hardware resources through Device Drivers Such an Operating System integrates at least a Network Layer with protocols such as IP (IPv4, IPv6), ICMP, IPsec, IGMP, IPX etc., and Transport Layer Protocols such as TCP, UDP, SCTP, DCCP, SPX etc.

The Operating System provides methods and Interfaces to higher Layer protocols to communicate with Peer Layers of the A2MCU leveraging the network and transport Layer protocols.

In one exemplary embodiment, the A2MCU as a CCBS-N communicates with the CCBS based on the CCBS-P, a set of communication mechanisms that are implemented by CCBS enabled devices. In that way, the A2MCU allows its Things to be registered with the CCBS platform and that information is used by a higher Layer, designated here as IoT Platform SW.

The IoT Platform software (SW) will provide libraries for "Things" from all the CCBS=Gs and all the CCBS-Ns that are registered with the system as well as all registered A2MCUs.

The Higher Layer Protocols may refer to but are not limited to a User Interface, through which administrators can use the libraries of the IoT Platform SW and through appropriate interconnections with LBs will create User Stories. Some of them may correspond to the functionality that, with a conventional MCU approach, an embedded Software running on the MCU would carry out.

Figure 16:
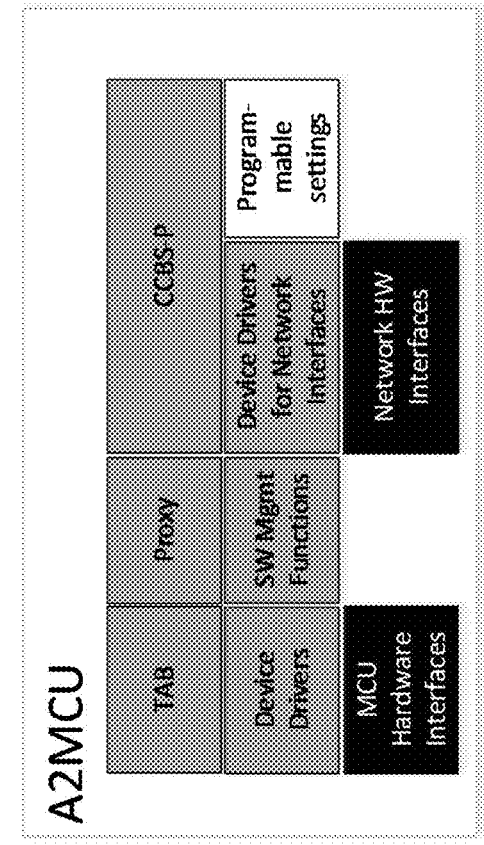
FIG. 16 shows a functional block diagram of the A2MCU.

FIG. 16 shows a functional block diagram of an exemplary A2MCU. In this Figure:

The "Device Drivers for Network Interfaces" (DDNI) is the Software Layer responsible for the connection of the A2MCU with the Remote Server via the Network that is "bridging" the A2MCU with the remote server (as shown in FIG. 15).

Examples of Network protocols that are most commonly used:
  TCP/IP based networks like Ethernet and Wi-Fi
  Personal Area Networks like Bluetooth®, ZigBee, Z-Wave, etc.
  A more primitive point-to-point connection over a wired or wireless bus. For instance, SPI, USB, UART or Sub 1 GHz RF connection.

The DDNI in an A2MCU may be hardwired or programmable or both. In general, each A2MCU manufacturer may decide on the level of flexibility to be provided vs the area and power consumption saving by using different types of memories, as explained before.

For instance, DDNI might be hardwired while a very small programmable area could be provided for saving settings like for instance the remote server address or credentials for wireless connection to a wireless router (e.g., Wi-Fi). This could be a non-volatile memory like EEPROM or Flash.

As can be is easily understood, the Proxy and CCBS-P Software entities which enable the A2MCU operation, are MCU Hardware and architecture independent while the TAB may be MCU dependent since the Device Drivers layer is usually HW dependent. However, there are HW functions and interfaces in the industry whose drivers are following well adopted standards such as the case of the USB interface and the various class drivers that have been specified. In this case, the TAB entity could also be considered MCU and HW independent.

A2MCU Use Cases

Hereinafter are presented some exemplary applications involving the use of an A2MCU within the IoT with processing units that are located either in direct connection with the A2MCU, within the same LAN as the A2MCU, or anywhere in the Internet.

Figure 17:
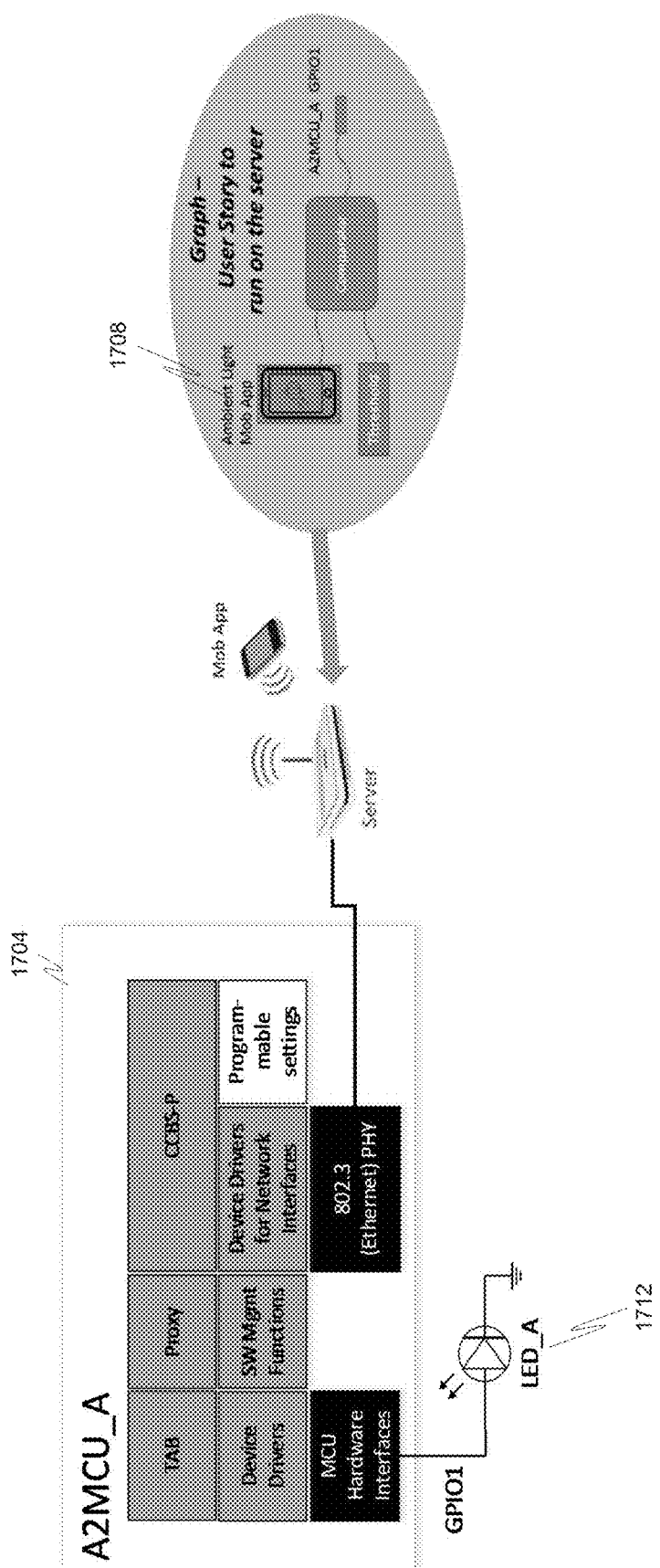
FIG. 17 shows an exemplary application involving a server physically connected to A2MCU.

FIG. 17 shows a straightforward exemplary A2MCU application (A2MCU_A) 1704. The task is to configure the GPIO1 of the A2MCU_A as an output, and let the output of a logic, a comparator in this exemplary case, drive that GPIO.

The cloud application that is represented by the Graph, shall carry out the following exemplary User Story: When the Ambient Light Sensor of the mobile phone 1708 detects a brightness level below a programmable threshold, turn the LED_A 1712 on, otherwise, keep it off. As described in FIG. 17, the Server running the Application of the A2MCU is a local one, with all the characteristics of a CCBS Server, physically connected to the A2MCU. The Server Address (SA) in this case can be stored in a small nonvolatile memory like EEPROM which may be internal or external to A2MCU.

Figure 18:
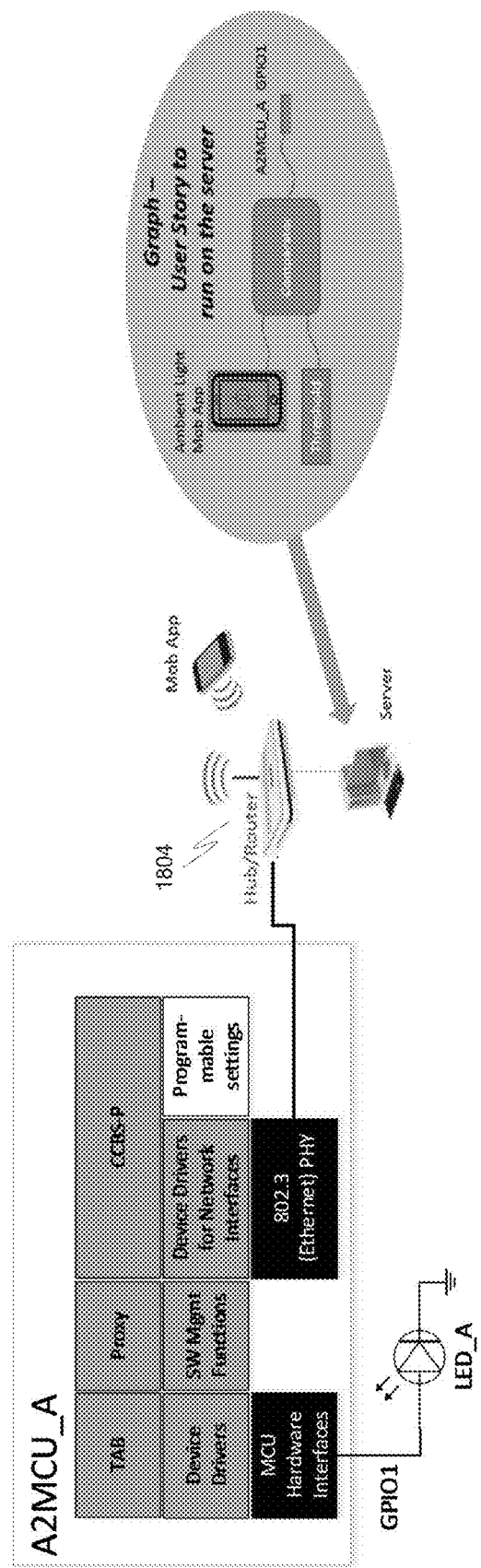
FIG. 18 is an exemplary application involving a server in the same LAN.

FIG. 18 shows an application similar to that in FIG. 17 with the exception that the server running the application is in the same LAN and communicates with the A2MCU through a Hub/Router 1804.

Figure 19:
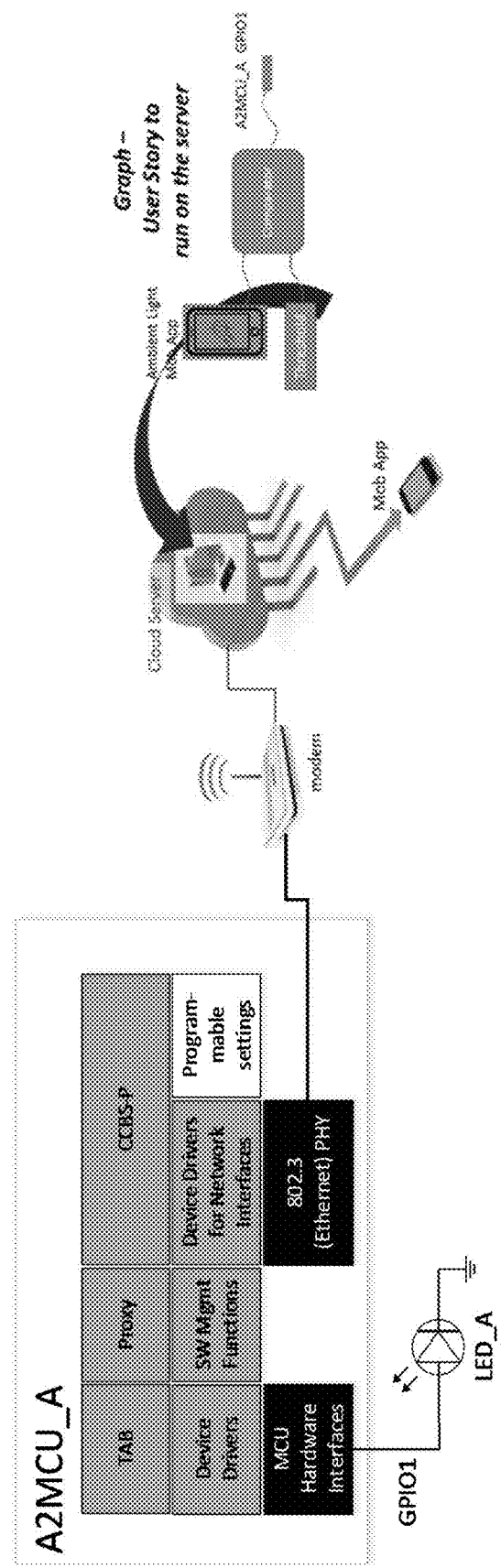
FIG. 19 is an exemplary application involving a network topology where 802.3 (or similar) is used to access the remote server.
Figure 20:
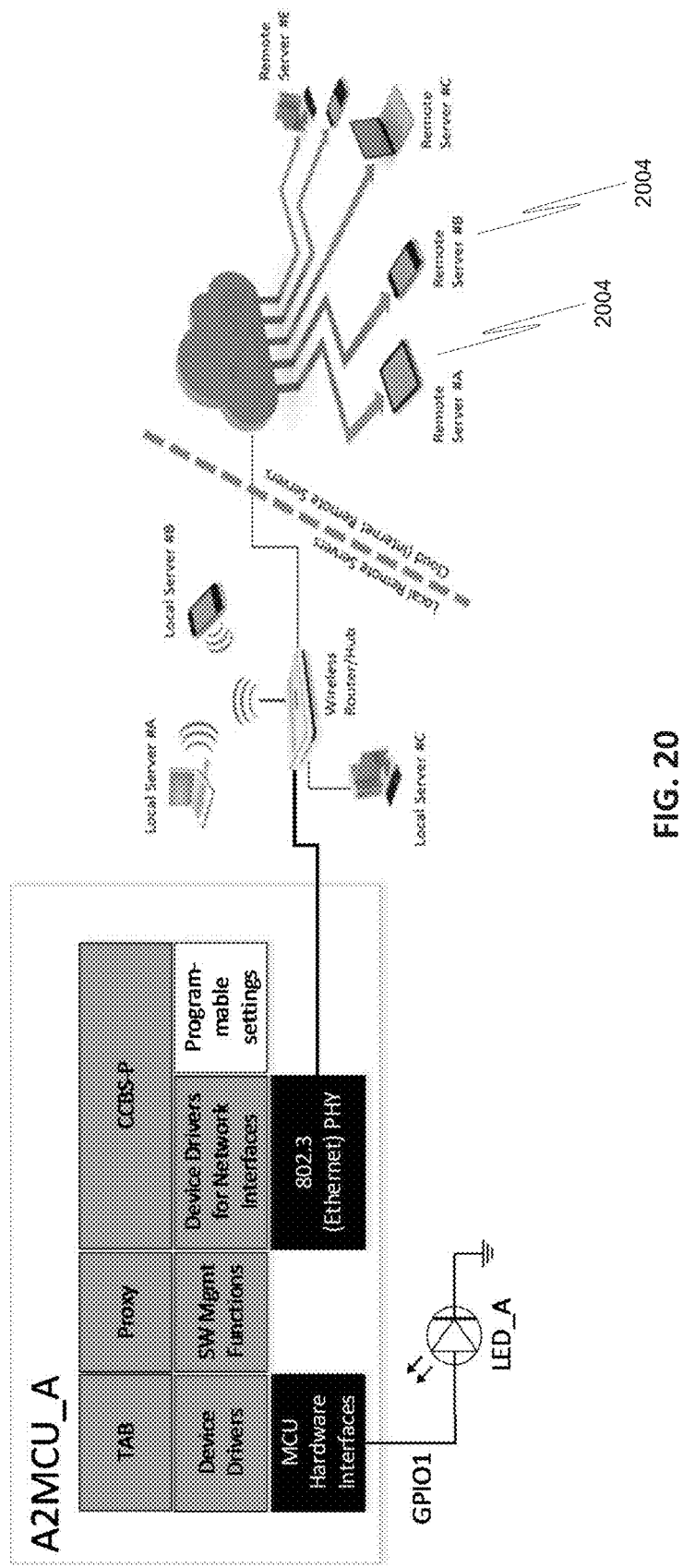
FIG. 20 is exemplary application involving a network topology where 802.3 (or similar) is used to access the remote server.

FIG. 19 shows an exemplary embodiment where the same application is running as in FIGS. 17 and 18, except that the server is located somewhere (anywhere actually) in the Internet, in a CCBS. The same A2MCU_A is used which may require some new settings for the new server address. FIG. 20 shows a scenario similar to FIG. 19, in which the remote server(s) 2004 can be any computing device, anywhere. As depicted in FIG. 20, candidate remote servers are wired, wireless, notebooks, workstations, etc.

In the three previous examples, the only information that has to be programmed to the A2MCU is the address location of the server. Other functions and drivers can be hardwired and therefore implemented in a small amount of memory that does not need to be RAM or flash. This translates into an easy to use device within many network architectures regarding, e.g., the location of the server, while keeping the size and power consumption (and battery demand) at a minimum.

By replacing much of the random access memory (RAM) that is used in today's MCUs with read only memory (ROM) in the A2MCU, wireless systems that use the A2MCU can switch off when idle and be awakened by an event (either from the server, or from one of the peripherals or somewhere else). With RAM based MCU devices, even if the device is idle it cannot switch itself off because the contents of the memory will not be preserved. In such a RAM-supported MCU it is possible to reduce its clock speed or just disable the clock to pause memory access.

However, even when this is supported, since power must still be applied, the device is not entirely powered down and there is can be a leakage current which causes battery drain. Not being able to power a system off when idle is a significant cause of short battery life in wireless systems. While in flash memory based system, the MCU can be switched off, the problem remains that flash based components require the use of technologies that consume more in normal operation than non-Flash ones.

When a Flash is used to store the application program of a legacy MCU, one of the following architecture options is usually applied:

A. Internal (parallel) Flash. The Flash is accessible directly by the CPU. The CPU can fetch and execute the instructions stored in the Flash immediately after power on, without spending time and energy for code pre-fetching. However, the limitations of this option can be the following:
  1. Flash technology occupies significantly bigger die area than other memory technologies (ROM, RAM, EEPROM)
  2. If the size of Flash is big enough, the cost of the MCU increases
  3. On the other side, if the number of bytes of the Flash is kept relatively small, the MCU may not be usable for certain applications that require big code size.
  4. The access speed of a Flash memory is much lower than that of a RAM or ROM in the same technology i.e., applications that require high processing CPU speed might not be doable.

B. External Parallel Flash. The A.3 restriction of Option A above is not valid in the case of an External Flash since it is a flexible architecture that allows to use the same MCU for any application and just change the size of the external Flash. However, the limitations with this option can be the following:
  1. Although the MCU die is small and so is its cost, the total system solution may be even more expensive than that of option A.
  2. Also, the Flash access speed of an external parallel flash is even lower than that of option A
  3. The package size of the MCU should be big enough to bond out a parallel bus for running code directly from the external MCU. That is not acceptable in many applications like wireless sensor devices where the form factor of the printed circuit board is important.

C. External (Serial) Flash. Usually, in an MCU based system with an external serial Flash, certain banks of the Flash code are pre-fetched to an internal parallel RAM with smaller size than that of the Flash, before the CPU executes it. Although the MCU package size is kept small the system is still flexible because the size of external Flash may vary depending on the needs of the applications, there are various other limitations:
  1. Long set-up time each time the MCU wakes up in order for the CPU to pre-fetch the code to the internal RAM which of course does not maintain its contents when the power is off.
  2. Long set-up time upon MCU wake up results to unnecessary waste of power
  3. Also, long set-up time upon MCU wake up, may not be acceptable for real time applications.

As a conclusion, there are many limitations with a Flash based MCU system, regardless of the configuration that is used.

Figure 21:
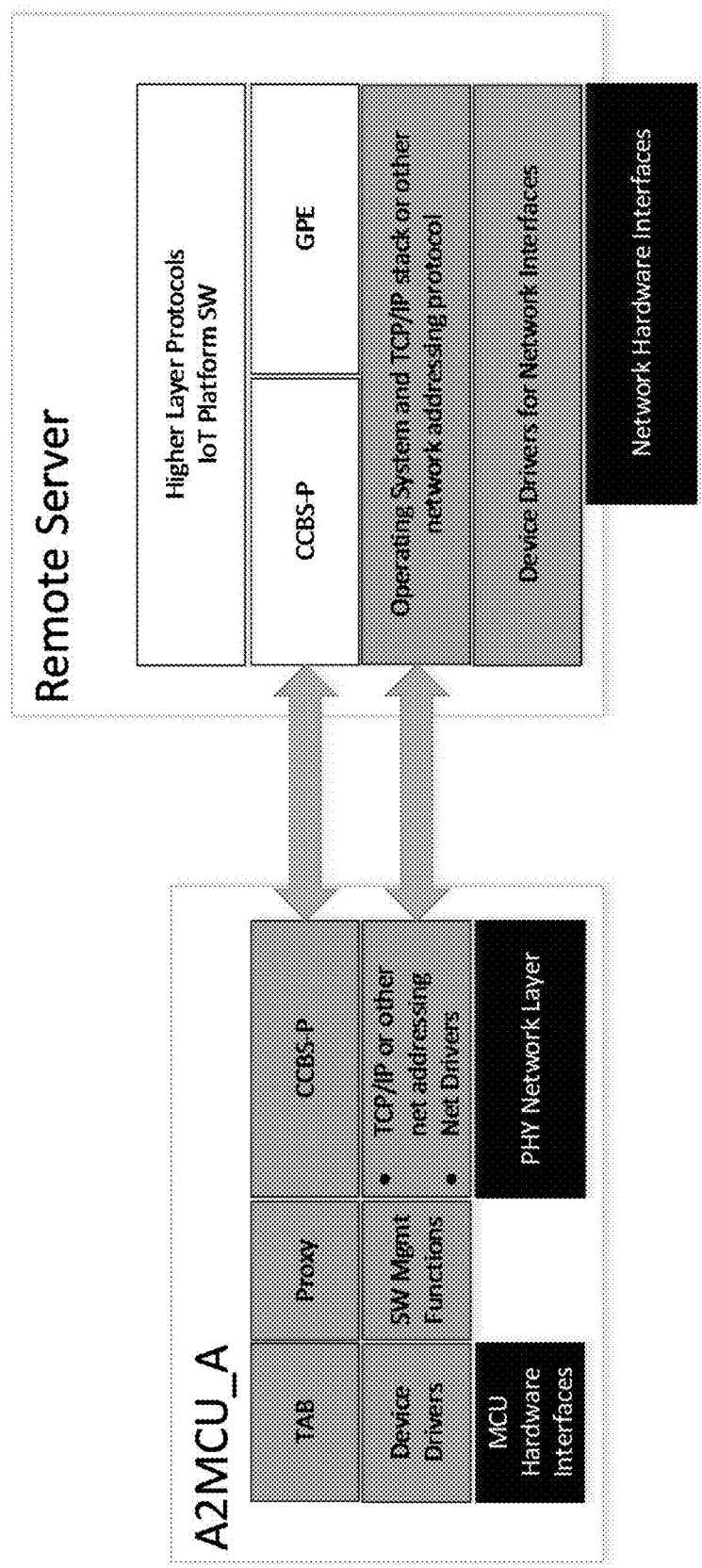
FIG. 21 illustrates exemplary Peer-to-Peer communications using a Layered Structure.

One of the important steps in enabling A2MCU supported systems is the establishment of the connection between the A2MCU and the server. FIG. 21 shows an example of how peer-to-peer communications between an A2MCU and a remote server can be functionally outlined. This addresses questions such as how does the A2MCU initially connect to the internet (or to wherever the server is located) and once it connects how is information accessed (by request, periodically, upon occurrence of an event).

This communications link relies on the CCBS-P. Its exemplary characteristics are:

Once the communication at a high level (e.g. TCP/IP) or in general at a Network and Transport Layer has been established, the CCBS-P layer of the A2MCU can communicate with its peer entity on the server.

This communication could also be based on several existing protocols like HTTP/HTTPS or follow a proprietary Session Layer Protocol defined by the server provider.

Depending on the application and the requirements, the CCBS-P layer of the A2MCU may keep the device in any of the low power modes that the manufacturer of the A2MCU supports and use a polling mechanism and wake up periodically to detect when the server has data available to send.

Using a polling mechanism is more likely to be the method used for data exchange between the A2MCU and the Remote Server for security reasons as well, but other protocols may be used where the Server may initiate a data exchange session—especially in cases where the Remote Server is located in the same area with the A2MCU and the A2MCU never sleeps.

Previous examples described the role the CCBS-P layer plays on the server, as the ambassador of the A2MCU functions by exposing each one of them as a "Thing" to the 'IoT Platform' Layer Also described was that the 'IoT Platform' SW Layer provides pre-made libraries for each Thing of one or more A2MCUs as well as other Devices, $3^{rd}$ party Services, Algorithms, simple logic, and the like. The Application SW will make use of these libraries to create User Stories.

The polling period, the power save settings and many other parameters should be Application Dependent. In a legacy MCU, one of the device drivers may be the Power Management Device Driver. For an A2MCU, as described above, the IoT Platform may expose a Thing corresponding to that driver using primarily configuration Inputs and Status Reporting Outputs.

Some example applications involving the use of A2MCUs within a more elaborate IoT network follows.

Figure 22:
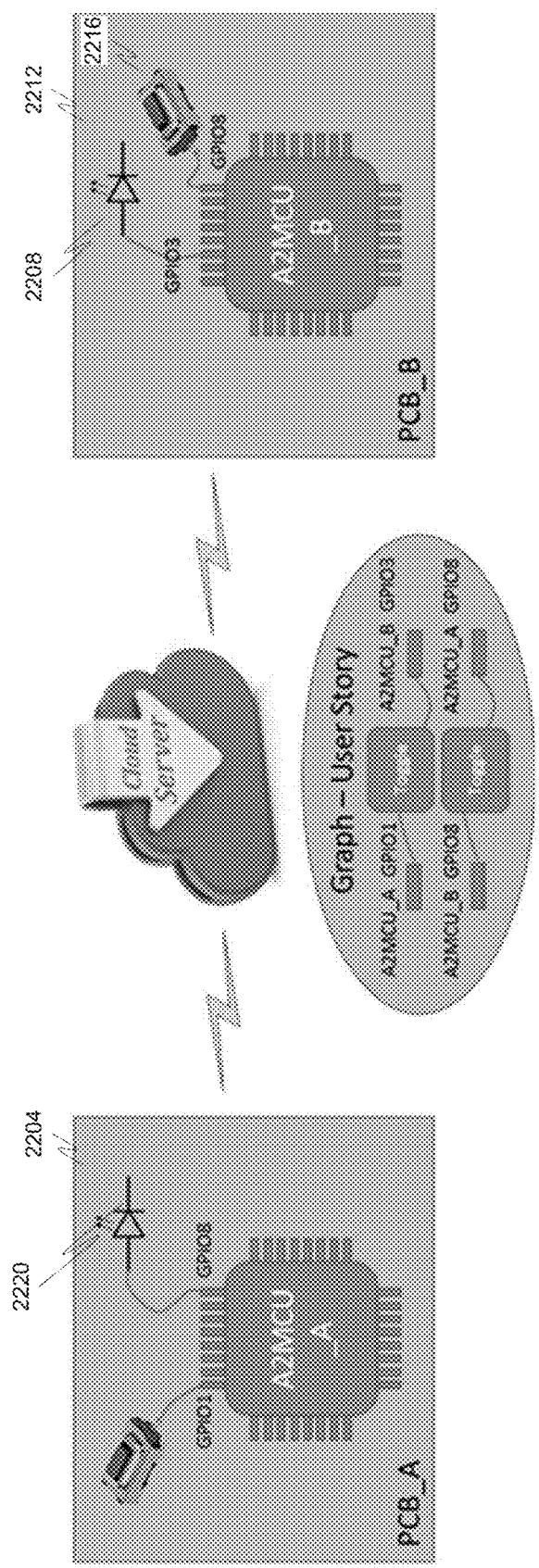
FIG. 22 is an example of "Application 1"

FIG. 22 shows an exemplary application of the following: when the button of the PCB_A 2204 is pressed, the LED 2208 of PCB_B 2212 will change state (OFF→ON or ON→OFF). Similarly, when the button 2216 of the PCB_B 2212 is pressed, the LED 2220 of PCB_A 2204 will change state. Note, the GPIO8 of A2MCU_A is used as output while the same GPIO (8) of the A2MCU_B is used as an input. With the exemplary embodiment this is not configured by the image running on those A2MCUs but from the cloud so that the image (i.e., the software resident on each A2MCU) is nearly identical.

Figure 23:
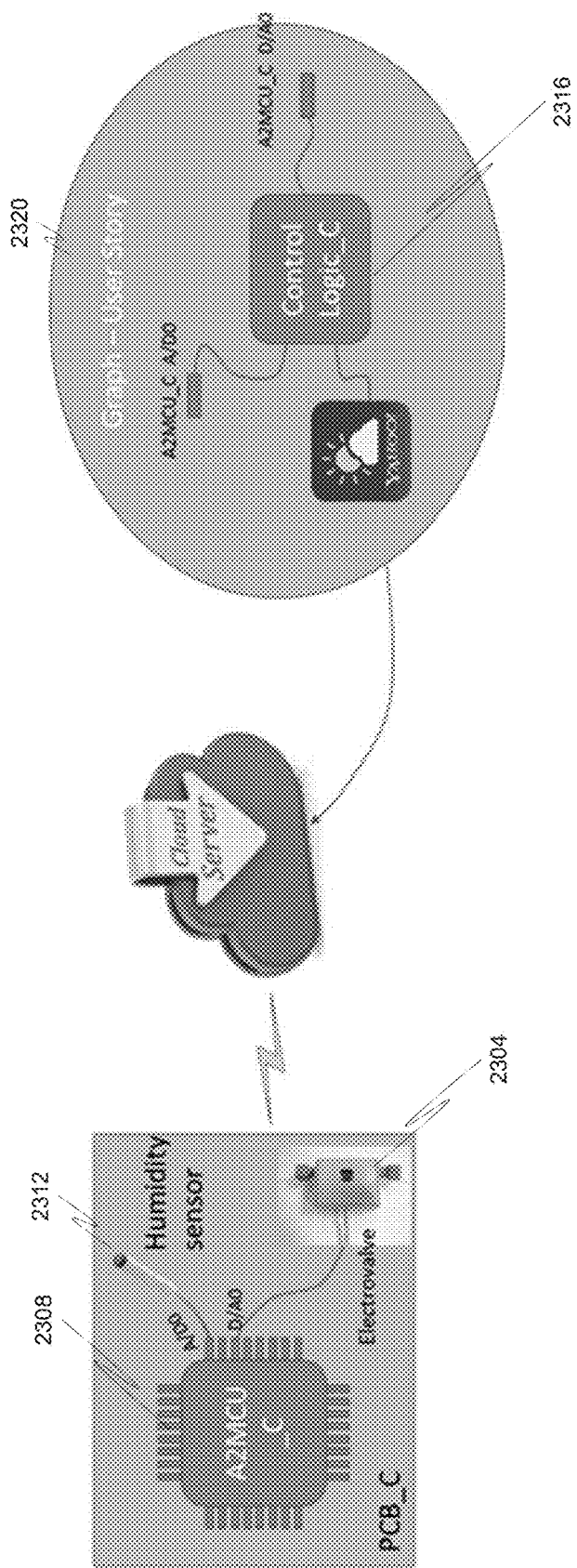
FIG. 23 is an example involving irrigation control.

FIG. 23 shows an example involving irrigation control. In a legacy automated irrigation system, a decision to start watering an area where plants are growing could be made locally by just checking the moisture of the ground using humidity sensors.

An advanced, cloud controlled irrigation system may not only get input from humidity sensors but use also weather forecast services to decide on the water flow. In this case, a networking device should be able to send the data from the humidity sensor to a remote server and the same or another device receive the decision of the server to adjust the flow.

As shown in FIG. 23, the Electro valve 2304 is controlled by the Digital to Analog output (D/A0) of the A2MCU_C 2308 and the humidity sensor 2312 is attached to the Analog to Digital converter input of the same A2MCU (MCU_C A/D0). The Control Logic 2316 of the User Story 2320 decides on the duration and the quantity of the water to pass through the Electrovalve and should drive the D/A0 appropriately.

Figure 24:
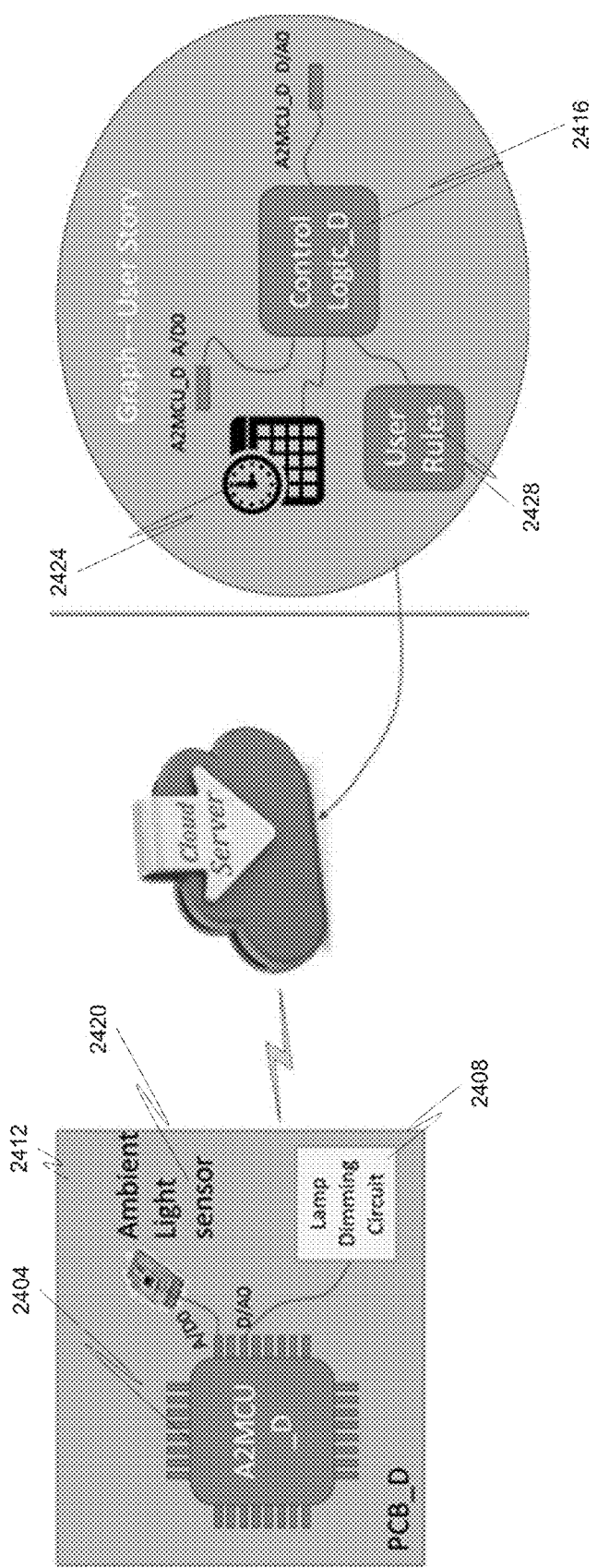
FIG. 24 is remote lighting control example.

In FIG. 24, the concept of an exemplary cloud controlled lamp dimming system is illustrated. The digital input value to the D/A converter of A2MCU_D (DAC input) 2404 which drives the dimming circuit 2408 of PCB_D 2412 is not calculated locally but on a remote server. The Software of Control Logic D 2416 that runs on the server requires three kinds of input data to calculate that DAC input:

The sampling data (ADC output) from the A/D converter of A2MCU_D that receives the analog output of an Ambient Light Sensor 2420 of PCB_D.

Clock and Calendar Information 2424 from an Internet Service and

User Rules 2428 (e.g. disable dimming in working hours and weekends).

ADC output and DAC input values are exchanged between the MCU_D and the remote server over any kind of network connection between the two of them. Enabled by exemplary embodiments discussed herein, the embedded software that the A2MCU_C of FIG. 23 and A2MCU_D of FIG. 24 execute can be identical.

Figure 25:
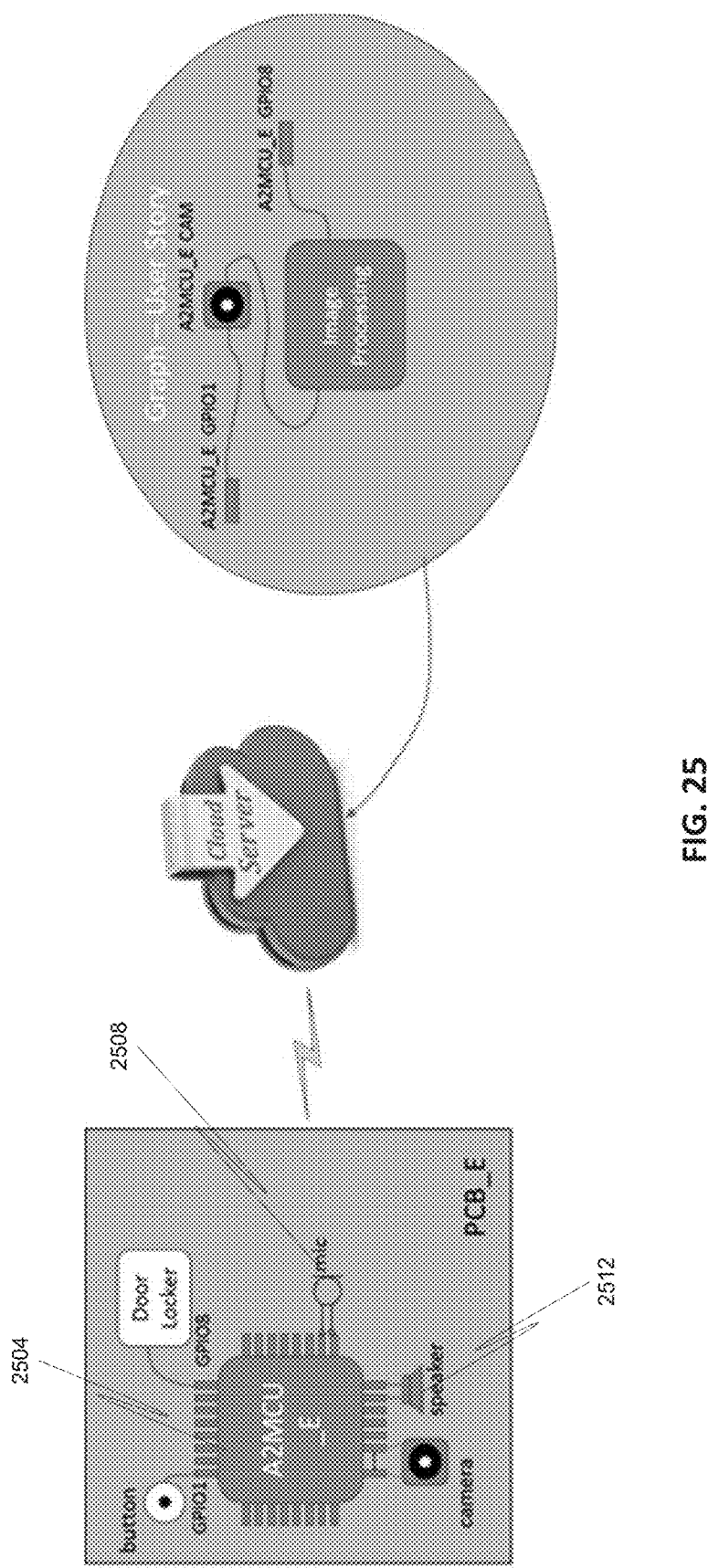
FIG. 25 is an A2MCU in an exemplary Video Doorbell environment.

In FIG. 25, the A2MCU_E 2504 is used in a video doorbell application which requires advanced image processing algorithms to recognize a face and decide whether or not to unlock a door.

Today's MCUs could not support such algorithms either because of limited memory or most likely because of limited processing power. With an A2MCU, all the complexity is transferred to the CCBS.

Additional graphs could be made to redirect the voice from the MIC Function/Thing 2508 to a 3rd party application like Skype® or from Skype® to the Speaker Function 2512, creating in this way a very advanced communication system based on an extremely low cost A2MCU.

The four examples depicted in FIGS. 22-25 have the following exemplary traits:

The Software that MCUs A-D (i.e., the A2MCU in each of the figures) can each execute identical source code regardless of the application of each example.

Therefore, if the same MCU is used by all printed circuit boards PCBs (A to D), the same Software image (binary code) could be loaded to the program memory of each those A2MCUs regardless of the application.

An exemplary embodiment thereby enables a new type of MCU, the application agnostic MCU (A2MCU) which can be operated with factory programmed ROM instead of reprogrammable memory such as RAM, Flash or EEPROM. This can result in a smaller die size for the integrated circuit that implements the A2MCU and provides for lower power consumption (less battery demand) and significantly lower cost.

Such an MCU that is controlled by a remote server and has only non-volatile memory for Software image storage, is ideal for Sensor Networks and IoT applications In summary, some of the exemplary advantages of the A2MCU include:

Enabling an MCU ideal for Wireless Sensor Networks

Extremely small size since no Flash and minimal RAM is required

- The A2MCU can be powered off when idle
- The only Software functionality ("The Software") that the MCU has to support is an integration of the device drivers for the peripherals with the API for the remote server
- The Software can be stored in a ROM resulting in very small size, very low power MCUs. No RAM or Flash is required for Program Memory
- The Software does not need to know about what type of sensor or "actuator" is connected to each peripheral on a particular PCB since that will be configured by the cloud server
- Considering the Application in FIG. 25, we realize the advantages of A2MCUs regarding:
  - Ability to support much more complex applications which require high processing power and a lot of memory
  - Expandability without Firmware Upgrade (e.g., start with the face recognition function and extend the application to leverage 3rd party services like Skype®)

Figure 26:
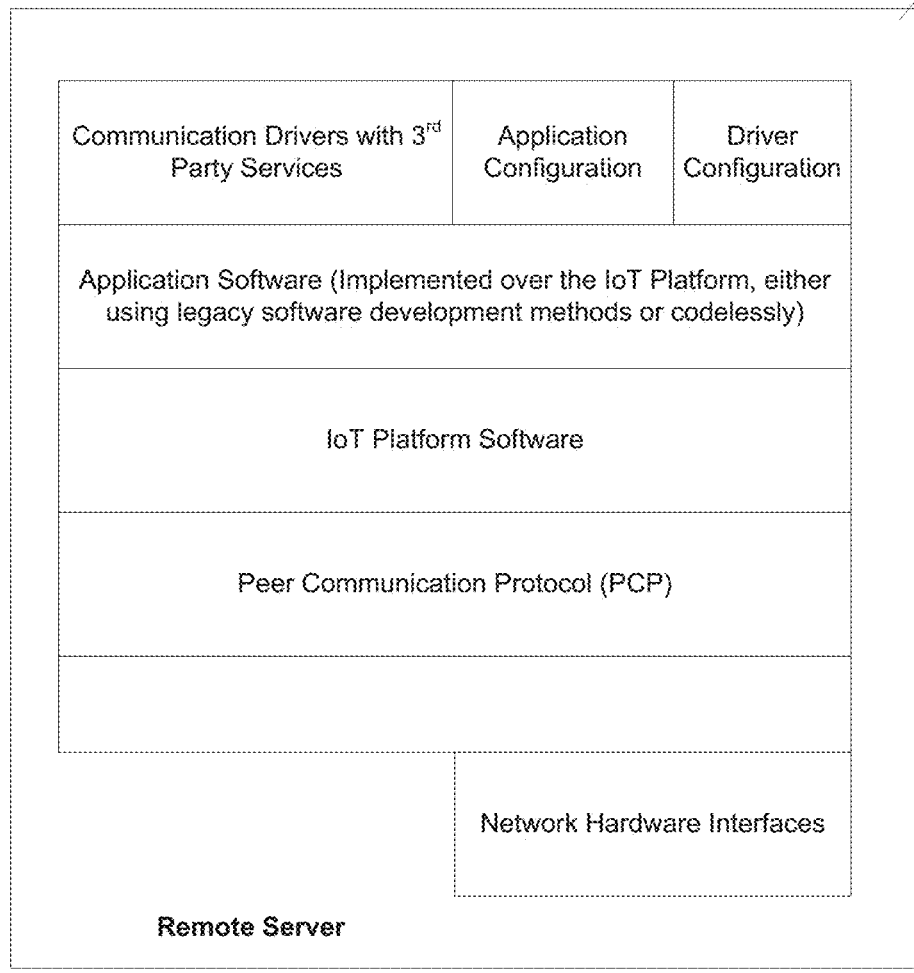
FIG. 26 illustrates an exemplary Remoter Server Functional Block Diagram.

An additional benefit of the A2MCU is its transformative impact on the development of embedded systems. In FIG. 26, a non-restrictive example of a functional block diagram of the software that could typically reside in the Remote Server 2604 is shown. When one learns how to program an MCU, the following is typical:

- Any MCU comes to programmers with a Software Development Kit (SDK), a product that MCU manufacturers can provide.
- A User friendly SDK for MCUs requires a significant investment and is usually provided to programmers free of charge
- Even the best SDK for MCUs cannot compete in flexibility and debugging capabilities to the corresponding tools for developing applications on servers using high level programming languages With an exemplary embodiment, the Application Software could be developed in any language since it runs on the server rather than the MCU. Also, codeless development of Applications can be enabled, since the operations that the code typically performs are abstracted to, e.g., icons, in graphs.

Figure 27:
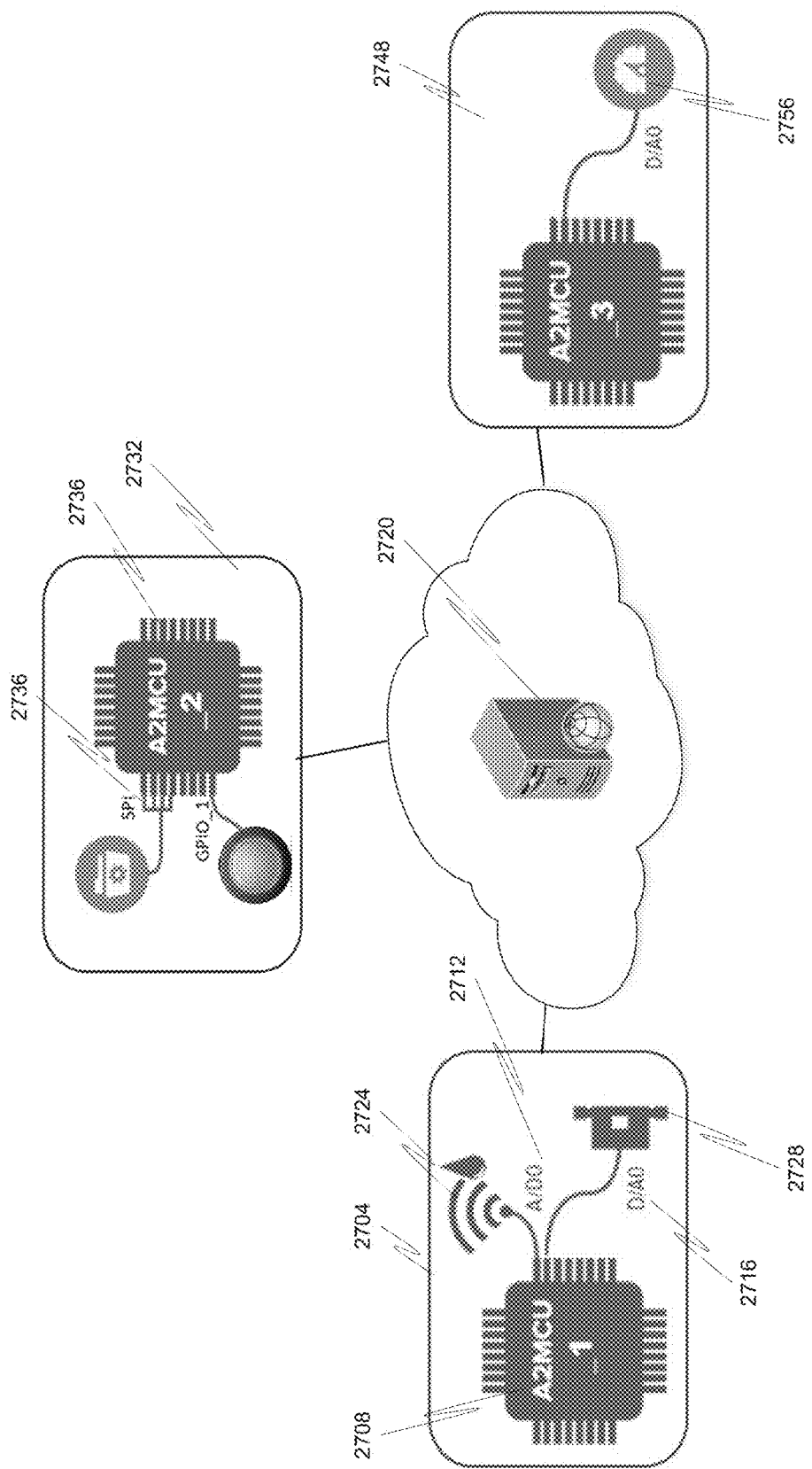
FIG. 27 illustrates an exemplary distributed, cloud based irrigation management system.

Also, the A2MCU technology has a profound impact to the development time and cost of distributed systems which consist of many edge network devices, cloud servers and 3rd party services. This is easier realized through the example of FIG. 27 which illustrates an exemplary distributed, cloud based irrigation management system. For the shake of simplicity, only 3 edge network device are shown in this example.

The first network device (ND1) 2704 includes the A2MCU_1 2708 which, among other interfaces, provides an Analog to Digital Converter (A/D0) 2712 and a Digital to Analog Converter (D/A0) 2716. The A2MCU_1 2708 can communicate with the CCBS 2720 directly or through a proxy as explained in previous sections. By running the PCP, The A2MCU_1 2708 allows cloud services running on the CCBS 2720 to control at least those two interfaces. The ND1 2704 also comprises a humidity sensor 2724 which is connected to the A/D0 2724 of the A2MCU_1 2708 and an electro valve 2728 for the water flow control, connected to the D/A0 2716 of the A2MCU_1 2708.

In another or the same location with the ND1, the second network device (ND2) 2732 includes the A2MCU_2 2736 which, among other interfaces, provides a Serial Peripheral Interface (SPI) 2736 and a general purpose input output pin (GPIO_2) 2740. Similarly, the A2MCU_2 2736 can communicate with the CCBS 2720 and by running the PCP, it allows cloud services running on the CCBS to control at least those two interfaces. The ND2 2732 also comprises a serial data flash which is connected to SPI of the A2MCU_2 and a light emitter diode (LED) 2744 connected to GPIO_2 2740 of the A2MCU_2 2732.

In another or the same location with ND2, the third network device (ND3) 2748 includes the A2MCU_3 2752, which, among other interfaces, provides a Digital to Analog Converter (D/A3). The A2MCU_3 2752 can also communicate with the CCBS 2720 and by running the PCP, it allows cloud services running on the CCBS to control at least that interface. The ND3 2748 also includes a water flow meter 2756 which is connected to D/A3.

The exemplary service to develop and deploy on CCBS could is described as follows:

Every 1 hour, measure the humidity of the ground where ND1 is located and send the data to CCBS. Also, check the weather forecast provided by an Internet based Weather Service (e.g., Yahoo® weather). Enable For education purposes, institutions can use a language like 'scratch' from MIT (https://scratch.mit.edu/—which is incorporated herein by reference in its entirety) to 'program' A2MCUs. The availability of embedded software engineers vs. the increasing demand for smart appliances based on MCUs is following a downward trend. The educational system is part of the problem since programming in embedded systems is not sufficiently taught in many academic institutions for various reasons. The use of A2MCUs could transform the way embedded systems are developed and enable easier to use embedded systems.

The exemplary IoT Platform discussed herein creates an abstraction layer between Applications and Functions as described in previous sections. The exemplary embodiments show the development of a design tool with a Graphical User Interface to let the Users create code-free applications. As described in previous sections, each Function is a Thing regardless of:
- Whether it is implemented by Hardware or Software
- Where the function is located
- Its complexity The exemplary tool can interpret the libraries of the IoT Platform software that correspond to Functions. Those libraries can be represented by objects with Inputs and Outputs. By interconnecting them, User Stories are created. The tool itself performs initial rule checking and User Story validation. Then, the tool can execute the User Story within a framework that interprets graphs and interconnections to get data from and send data to functions. While the use of such a tool is optional, it dramatically reduces the development time of applications.

For the exemplary A2MCU, an application/User Story may incorporate only Functions/Things of the A2MCU or let them interact with external ones. An exemplary embodiment offers the following advantages in terms of application development:
- Development of only one application Software running on the server instead of two: an embedded one for an MCU and a server one.
- Development of applications using high level languages or even Graphical User Interfaces rather than a specific programming language mandated by the tools each manufacturer provides
- Extremely short development and integration cycles using advanced debugging methodologies that are not limited by the resources of an embedded system Sharing within and/or Across Accounts The concept of representing input and output physical endpoints and services with simple graphical entities can be extended to elegantly share, and act on, events across both:
- different sub-classes of the same account (members of a single family), and
- users on different accounts of the same CCBS In this fashion, user stories can include more than one user, either internal or external to the User Story's originating account that can scale to thousands of users.

In the simplest case, one can diversify stories based on different family members and situations, e.g., a switch enabling Internet access may only be enabled by User 1a after a certain hour of the day, while it may be free to be controlled by everyone during other times.

Alternatively, Users 1a and 1b may receive alerts when certain events happen, but not the rest of the family members.

In a fashion similar to the way access levels can be configured in Internet services, share levels can be set to one or more specific accounts (or sub-users of the account), to one or more groups, or made completely public. User 1 can then browse through other users' available endpoints that are either shared explicitly with User 1 or made public, and select one to use in a new User Story.

This concept can then be scaled up, where Company A for example pushes informational events to Endpoint E. Users can subscribe to E and use it to construct User Stories that involve both logical and physical entities. Example user stories include:
- email me when tickets for theater/cinema/concert I am interested in become available; Skype® me when they are running low
- when a band I follow publishes new music on Spotify®, play samples of it on my home's speaker, if I am in the room
- when the team I follow scores, show me a replay via a Skype®/hangouts video call. Text me—in the same service, since email is typically not suitable for transient info—the final result when the game ends.

Some of these may already be somewhat provided (through RSS feeds or email lists) but now the user is in control of how each event is to be acted upon.

More advanced users (or the originating company itself) may create more complex RPAs which users can import (and alter) into their own environment.

Existing services that play the role of event aggregators (e.g. IFTTT channels, Pushbullet, etc) can also be used as inputs to User DMAs.

Interconnecting Network Devices with Social Networks and Communication Applications As a further example of the enhanced use of devices by users across a global network, a scenario is presented involving a cloud computing based system (CCBS) which supports at least one registered user. Each user maintains an account with where at least one network device is linked.

The CCBS comprises computer servers and storage devices and, in a larger scale, the CCBS is supposed to maintain a high number of user accounts where many devices are linked with each account.

Figure 28:
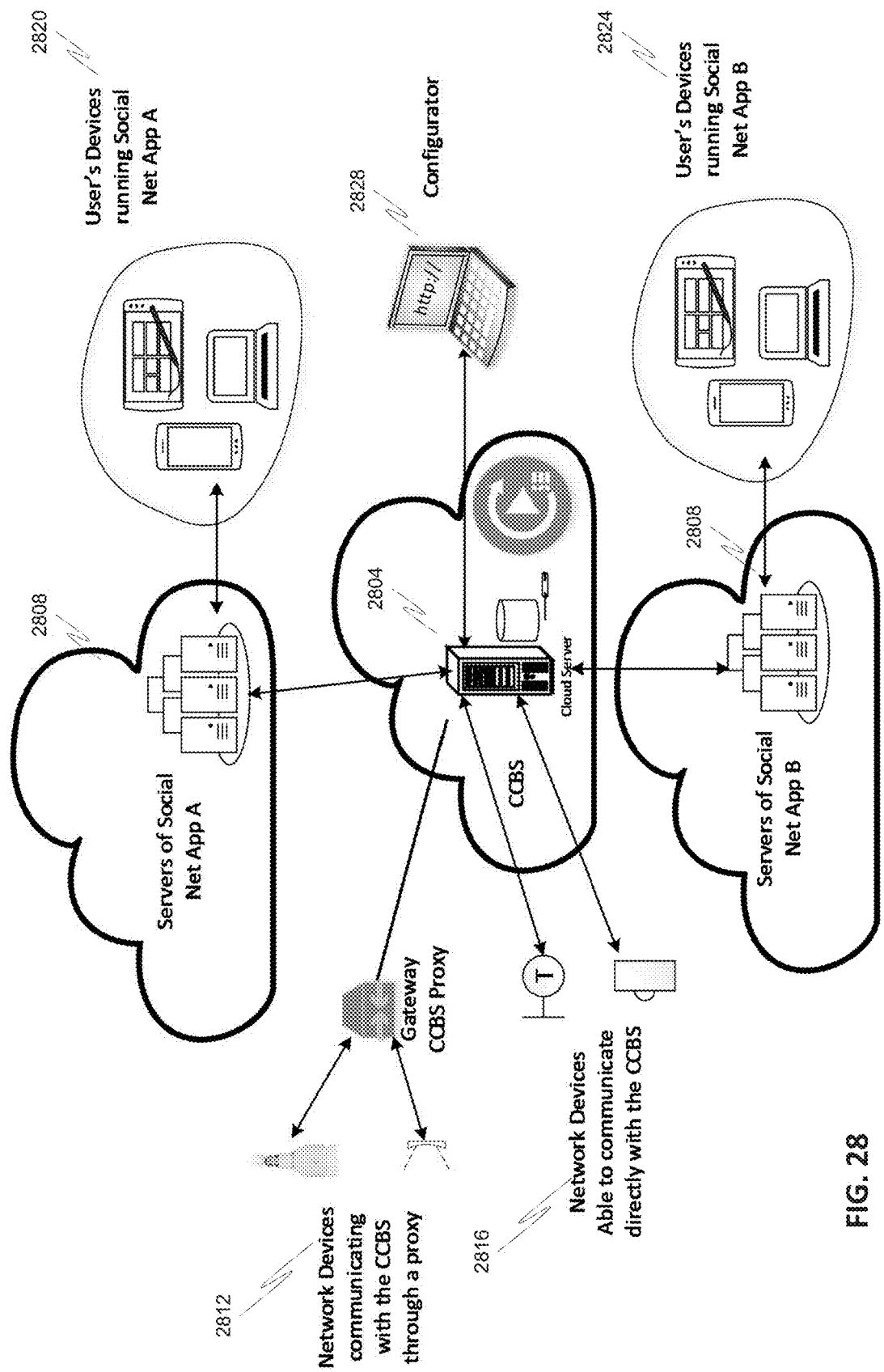
FIG. 28 provides an overview an exemplary infrastructure blocks and the endpoints.

FIG. 28 provides an overview of one exemplary method emphasizing the infrastructure blocks and the endpoints.

Infrastructure blocks are those in the various clouds:
- The CCBS 2804 of an exemplary embodiment in the middle of the picture
- The servers of the various Social Network and Communication Applications like Skype®, Hangouts®, Facebook®, Twitter®, Viber®, etc., are shown as 2808—For simplicity, only two clouds for such applications are shown in the Figure.

The exemplary endpoints shown in FIG. 28 are:
- Network Devices 2812 that are not compliant with the communication protocol of the CCBS and require a proxy, e.g., a gateway able to communicate with the CCBS
- Network Devices 2816 able to exchange messages directly with the CCBS
- Users' Devices 2820 (any computing device like laptop, desktop, tablet, mobile phone) which run App A client application software and communicate with the cloud of Communication/Social NetApp A and similar Users' Devices 2824 which run App B client application Software.
- Configurator devices 2828 which could be the same Users' device running one of the communication applications mentioned above In one exemplary embodiment the CCBS 2804 is able to handover data from devices to social networks and vice versa. To achieve this, several sign-in accounts for social networks are handled simultaneously by the CCBS. The method can be better understood by describing a real use case through FIG. 29.

A user 'a1' is a registered CCBS user with an account a1@CCBS. The CCBS offers the user a number of services to manage and control network devices in a single or many areas of their interest:
- O1: a smart bulb
- O2: a Motion Detector
- O3: a surveillance camera All those devices are paired with a1@CCBS and they are authorized to send data to CCBS and receive data from it. 'a1' is using a mobile phone (Mobile a1) or PC to communicate with friends through an internet based communication application. For simplifying the description, it is assumed that the communication application being used is Skype® by signing in to a1@Skype account.

'a1' would like to:
a. receive a message on Skype® whenever O2 detects motion in its effective area.
b. to watch over Skype® what is going on in the home based on video transmitted by O3 surveillance camera
c. turn on O1 using Skype®.

Figure 29:
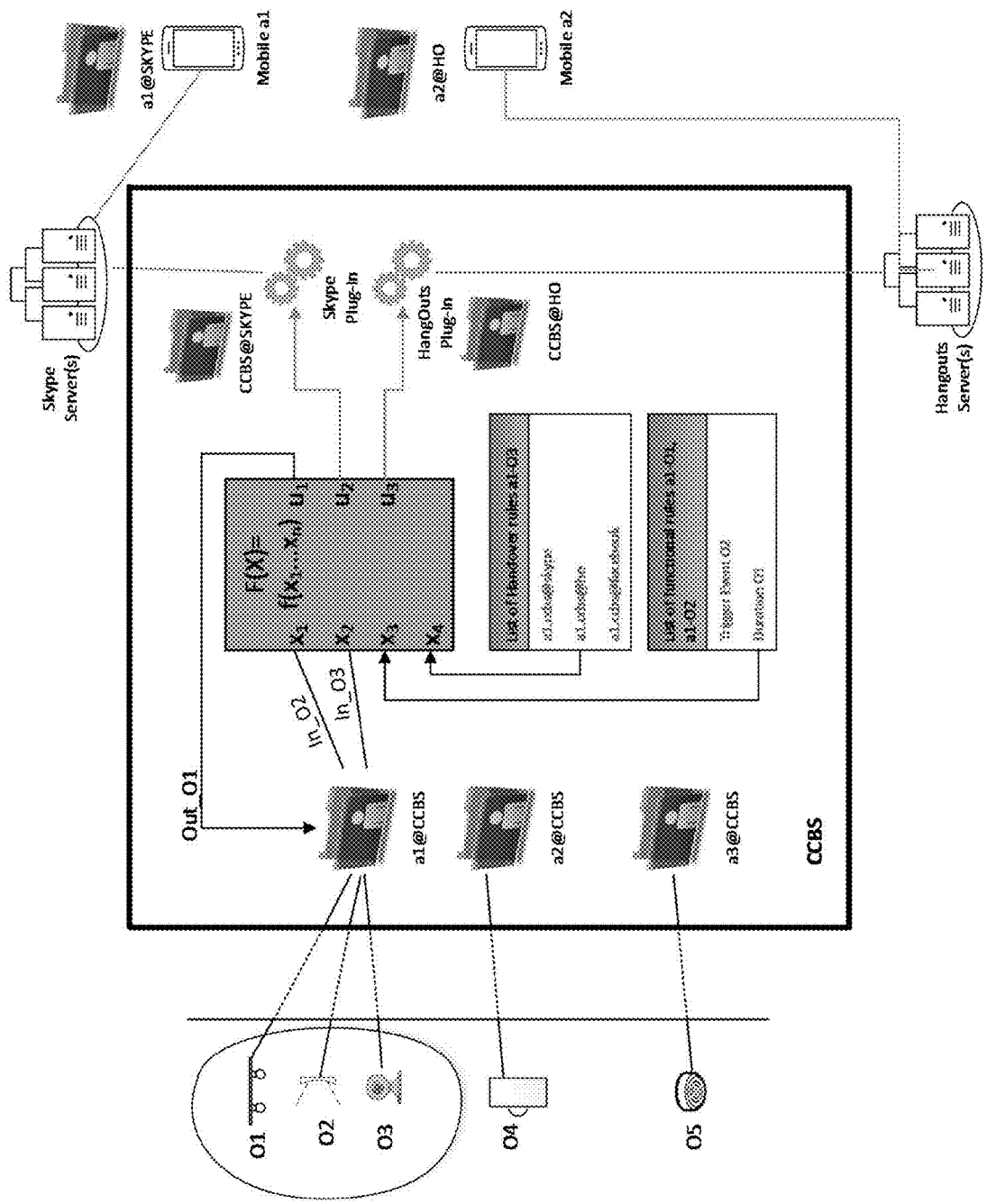
FIG. 29 provides an exemplary real-world use case of the technology described herein.

In the example, a1 does the following:
1. Use the Skype® Plug-In of the CCBS, which incorporates one of many possible built-in Skype® accounts, CCBS1@Skype. In the present invention, CCBS Skype® accounts of type CCBSx@Skype are not handled by a person, like in the case of a1@Skype but from the mechanism of CCBS through an Application Programming Interface (API) that most communication applications like Skype® provide. The CCBS of the exemplary embodiment may support at least one built-in account of a social network or communication application like Skype®, but multiple such accounts can also exist for load balancing when a greater number of end users simultaneously use the services of CCBS over their client application software.
2. Associate the a1@CCBS account with the Skype® plug-in. The user will then receive a "Contact Add request" from the built-in Skype® account CCBS1@Skype which has to be accepted if full communication capabilities are required.
3. Create a function to be executed on CCBS, F(X), with a number of inputs and outputs. In FIG. 29, this function is shown with 4 inputs and 3 outputs. The function is created based on rules that correspond to the aforementioned actions 'a'-'c'.

4. Enable this function for the account a1@CCBS

The function block F(X), driven by the user's rules will be able to do the following to satisfy actions 'a'-'c':
  a. At the reception of an event from O2, send an instant Skype® message (IM) to a1@Skype from the built-in Skype® CCBS1@Skype, i.e., from an account handled by a machine through the API to an account managed by a person through a Human Interface API. If 'a1' has approved the "Contact Add Request" as described in step 2 above and they have signed into Skype® with one of his computing devices like the 'Mobile a1' they will get a message from CCBS1@Skype which is one of the Skype® account in a list of contacts. The contents of the message can be defined by the user's rules.
  b. 'a1' can initiate a video call to CCBS1@Skype from their personal Skype® account a1@Skype. The CCBS mechanism of the exemplary embodiment, based on function F(X), will answer the video call and by using the video stream API of Skype® will send the frames the surveillance camera O3 captures.
  c. 'a1' can send an IM from a1@Skype to CCBS1@Skype. If the IM has a specific format, F(X) can parse it and send a message to O1 to turn on the lights. For instance, the IM for this purpose could be "@O1 1" which is a command with 3 arguments with the following meaning:
  d. @O1: the command is targeted to O1
    1: Turn on The rules for the interpretation of the arguments of the commands can be also programmed.

It is obvious that almost all communication and social network applications can be used in a similar way to exchange data with network devices. The exemplary embodiments are based on the principle that CCBS servers can handle accounts of those applications which are associated with users' CCBS accounts. The difference between CCBS handling of such application versus human handling is that CCBS handling makes use of an API that most of those applications provide while people use the Human Interface API.

For purposes of explanation, numerous details are set forth in order to provide a thorough understanding of the present embodiments. It should be appreciated however that the techniques herein may be practiced in a variety of ways beyond the specific details set forth herein.

For example, additional aspects are directed toward a method for distributing processing required to execute a decision making algorithm to a cloud based device and a local area network device in order to realize at least one of a reduced turnaround time, algorithm cloning or avoidance of network failure.

Further aspects are directed toward a method of connecting network devices with communication and social network applications using cloud based control logic.

Furthermore, while the exemplary embodiments illustrated herein may show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a telecommunications network. As will be appreciated from the description, and for reasons of computational efficiency, the components of the system can be arranged at any location within a distributed network without affecting the operation of the system.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts/operational flows have been discussed in relation to a particular exemplary sequence of events, it should be appreciated that changes to this sequence can occur without materially effecting the operation of the embodiment(s). Additionally, the exact sequence of events need not occur as set forth in the exemplary embodiments, but rather the steps can be performed by one or the other device(s) in the system. Additionally, the exemplary techniques illustrated herein are not limited to the specifically illustrated embodiments but can also be utilized with the other exemplary embodiments and each described feature is individually and separately claimable.

The above-described system can be implemented on a wireless communications device(s)/system(s), such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, 4G, 4G LTE, 5G, and the like.

The components illustrated herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The systems, methods and protocols illustrated herein can be readily implemented in hardware and/or software using any known or later developed systems or structures, devices and/or software by those of ordinary skill in the applicable art from the functional description provided herein and with a general basic knowledge of the computer and communications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, an IoT device, or the like. The system can also be implemented by physically incorporating the system and/or method into a software and/or hardware system, such as the hardware and software systems of a server and/or Thing and/or edge device.

It is therefore apparent that there has at least been provided systems and methods for managing Things. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A system that controls and interfaces with one or more Internet of Things devices comprising:
   at least one gateway;
   at least one Internet of Things device connected to the gateway;
   a cloud computing based system in communication with the device;
   a user story interpreter that converts a master graph into one or more virtual graphs; and
   a processor executing a rule processing application process which parses a set of user rules generated from a user story into a number of decision making algorithms which will be distributed from the cloud computing based system to the at least one gateway to control the at least one Internet of Things device.

2. The system of claim 1, wherein the one or more virtual graphs are for one or more of a gateway, a cloud server and another gateway.

3. The system of claim 1, wherein the gateway is capable of executing at least one of a decision making algorithm and a virtual graph.

4. The system of claim 1, further comprising an application agnostic microcontroller unit.

5. The system of claim 4, wherein the application agnostic microcontroller unit includes a Thing abstraction bus module and a communications interface that uses a cloud computing based system protocol to control at least one device driver within the microcontroller unit, wherein the device driver controls at least one of a register and a memory location within the microcontroller unit.

6. The system of claim 5, wherein the Thing abstraction bus module is capable of translating heterogeneous protocols of the connected Thing to an events and commands bus protocol within the microcontroller unit.

7. The system of claim 5, wherein the at least one device driver has one or more owners and wherein an owner is a user who has signed up with the computing based system and can enable or disable at least one other user to receive or send data to the device driver.

8. The system of claim 1, wherein the cloud computing based system comprises a cloud computing based system protocol, one or more higher layer protocols, a graph processing engine, device drivers, a processor, memory, and a network interface.

9. A microcontroller device comprising:
   a Thing abstraction bus module;
   one or more device drivers;
   at least one central processing unit,
   wherein the Thing abstraction bus module provides external access to the one or more device drivers;
   wherein the one or more device drivers control or monitor at least one of a register, memory location within the device;
   wherein the device drivers are non-changeable by a user of the microcontroller device; and
   wherein the microcontroller device is within a system that further includes a cloud based device and a local area network device, where the system executes a decision making algorithm that utilizes the device to realize at least one of the reduced turnaround time, algorithm cloning or avoidance of network failure.

10. The device of claim 9, wherein the at least one of a register and memory location accesses or controls peripherals, wherein said peripherals include pins on the microcontroller that connect to one or more of a general purpose I/O (GPIO) device, analog to digital converters (A/D), digital to analog converters (D/A), parallel busses, serial synchronous and serial asynchronous busses.

11. The device of claim 9, wherein the device drivers reside in read only memory (ROM).

12. The device of claim 10, where the access or control of the peripherals utilizes software routines which reside in volatile or non-volatile type of memories.

13. A method of controlling one or more Internet of Things devices comprising:

executing, by a processor, a rule processing application process;

parsing a set of user rules generated from a user story into a number of decision making algorithms;

converting a master graph into one ore more virtual graphs; and distributing from a cloud computing based system the decision making algorithms to at least one gateway to control at least one Internet of Things device.

14. The method of claim 13, wherein the one or more virtual graphs are for one or more of a gateway, a cloud server and another gateway.

15. The method of claim 13, wherein the gateway is capable of executing at least one of a decision making algorithm and a virtual graph.

16. The method of claim 13, further comprising utilizing an application agnostic microcontroller unit.

17. The method of claim 16, wherein the application agnostic microcontroller unit includes a Thing abstraction bus module and a communications interface that uses a cloud computing based system protocol to control at least one device driver within the microcontroller unit, wherein said device driver controls at least one of a register and a memory location within the microncontroller unit.

18. The method of claim 13, further comprising utilizing a cloud computing based system that comprises a cloud computing based system protocol, one or more higher layer protocols, a graph processing engine, device drivers, a processor, memory, and a network interface.

19. The method of claim 17, wherein the at least one device driver has one or more owners and wherein an owner is a user who has signed up with the computing based system and can enable or disable at least one other user to receive or send data to the device driver.

\* \* \* \* \*